US012809605B2

(12) United States Patent
Krishna Prasad et al.

(10) Patent No.: US 12,809,605 B2
(45) Date of Patent: Nov. 24, 2026

(54) NEURAL NETWORK-BASED CONTEXT-AWARE CODE TRANSLATION AND OPTIMIZATION

(71) Applicant: International Business Machines Corporation, Armonk, NY (US)

(72) Inventors: Rahul Krishna Prasad, White Plains, NY (US); Rangeet Pan, White Plains, NY (US); Venkata Nagaraju Pavuluri, New Rochelle, NY (US); Michele Merler, New York City, NY (US); Saurabh Sinha, Danbury, CT (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 181 days.

(21) Appl. No.: 18/540,228

(22) Filed: Dec. 14, 2023

(65) Prior Publication Data

US 2025/0199787 A1 Jun. 19, 2025

(51) Int. Cl.
*G06F 8/41* (2018.01)
*G06N 3/0455* (2023.01)

(52) U.S. Cl.
CPC .............. *G06F 8/447* (2013.01); *G06F 8/427* (2013.01); *G06N 3/0455* (2023.01)

(58) Field of Classification Search
CPC ........ G06F 8/447; G06F 8/427; G06N 3/0455
USPC ........................................................ 717/143
See application file for complete search history.

(56) References Cited

U.S. PATENT DOCUMENTS

| | | | |
|---|---|---|---|
| 10,073,843 B1 | 9/2018 | Seligman et al. | |
| 11,457,052 B1 | 9/2022 | Krebs et al. | |
| 11,621,988 B1 | 4/2023 | Krebs et al. | |
| 2011/0004574 A1* | 1/2011 | Jeong ....................... | G06N 5/02 718/104 |
| 2015/0205893 A1* | 7/2015 | Drumm ............ | G05B 19/41885 703/2 |

(Continued)

FOREIGN PATENT DOCUMENTS

JP 2025-096185 A1 6/2025

OTHER PUBLICATIONS

Lester, B., Al-Rfou, R., & Constant, N. (Nov. 7, 2021). The power of scale for parameter-efficient prompt tuning. arXiv preprint arXiv:2104.08691.

(Continued)

*Primary Examiner* — Bradford F Wheaton
(74) *Attorney, Agent, or Firm* — CHIP LAW GROUP

(57) ABSTRACT

Systems and methods for efficiently translating program code from a source language to a target language. Input source code is parsed, using a processor device, into an Intermediate Representation (IR). A structural and semantic model of the source code are established by applying static analysis to the IR, and a program skeleton of the target code is constructed from the IR, including generating context-aware placeholders. The IR is transformed into a Single Static Assignment (SSA) form, and a System Dependency Graph (SDG) is built from the SSA form. The SDG is traversed to order translation tasks, and ordered tasks are translated into the target language using a Large Language Model (LLM). A translated program is generated by integrating translated code segments into a coherent program structure in the target language.

15 Claims, 13 Drawing Sheets

(56) References Cited

U.S. PATENT DOCUMENTS

| | | | | |
|---|---|---|---|---|
| 2018/0081655 | A1* | 3/2018 | Kudriavtsev | G06F 8/51 |
| 2018/0357145 | A1* | 12/2018 | Sarangapani | G06F 11/368 |
| 2019/0362007 | A1* | 11/2019 | Jeong | G06F 16/24545 |
| 2023/0222043 | A1* | 7/2023 | Lee | G06F 11/3068 702/127 |
| 2023/0350657 | A1* | 11/2023 | Singh | G06N 3/045 |
| 2024/0184555 | A1* | 6/2024 | De Toni | G06N 3/045 |

OTHER PUBLICATIONS

Ge, T., Hu, J., Dong, L., Mao, S., Xia, Y., Wang, X., . . . & Wei, F. (Dec. 1, 2022). Extensible prompts for language models. arXiv preprint arXiv:2212.00616.

Zhang, L., Rao, A., & Agrawala, M. (Sep. 2, 2023). Adding conditional control to text-to-image diffusion models. In Proceedings of the IEEE/CVF International Conference on Computer Vision (pp. 3836-3847).

Smart Command Line Contextualization Mechanism (Jan. 22, 2020) https://ip.com/IPCOM000261052.

System and Method for machine learning based translation of automation code (Apr. 29, 2022) https://ip.com/IPCOM000269641.

A Multi-Language Software Dependecy Analysis and Visualization Tool (Dec. 20, 2022) https://ip.com/IPCOM000271483.

Zhao, T., Tang, X., Zhang, X., & Wang, S. (Mar. 16, 2021). Semi-supervised graph-to-graph translation. In Proceedings of the 29th ACM International Conference on Information & Knowledge Management (pp. 1863-1872).

Li, L., Way, A., & Liu, Q. (Mar. 20, 2021). Dependency Graph-to-String Statistical Machine Translation. arXiv preprint arXiv:2103.11089.

Galley, M., & Manning, C. D. (Aug. 2, 2009). Quadratic-time dependency parsing for machine translation. In Proceedings of the Joint Conference of the 47th Annual Meeting of the ACL and the 4th International Joint Conference on Natural Language Processing of the AFNLP (pp. 773-781).

Andrade, D., Matsuzaki, T., & Tsujii, J. I. (Jun. 24, 2011). Learning the optimal use of dependency-parsing information for finding translations with comparable corpora. In Proceedings of the 4th Workshop on Building and Using Comparable Corpora: Comparable Corpora and the Web (pp. 10-18).

* cited by examiner

NEURAL NETWORK-BASED CONTEXT-AWARE CODE TRANSLATION AND OPTIMIZATION

BACKGROUND

The present invention generally relates to neural network-based automated code translation between programming languages, and more particularly to utilizing neural network models and contextual data processing to enhance the accuracy and efficiency of translating code by imparting control in programming language translation with Large Language Models (LLMs).

Traditionally, fine-tuning pre-trained models has been a staple in code translation tasks, typically involving the conversion of source code to a standard Intermediate Representation (IR), such as Single Static Assignment (SSA), and training models to translate from this IR to the target language. This conventional method leverages a vast corpus of source and target code snippets to repeatedly update the model through gradient descent, often requiring extensive labeled examples for model convergence. While effective in some respects, this approach has notable downsides, including the necessity for large, task-specific datasets and the risk of poor generalization and reliance on potentially misleading features of the training data. Additionally, the standard SSA-based IR, while simplifying the code for efficient data flow analysis and facilitating compiler optimizations, often strips away the nuanced language constructs crucial for understanding the original code's intent and logic. This loss of language-specific properties, such as object-oriented programming elements, along with the introduction of synthetic variables, creates a significant semantic gap that can hinder the readability and translatability of the target code.

Moreover, the rise of Large Language Models (LLMs) has introduced new methodologies for in-context learning, which, despite their success in natural language processing tasks, face considerable challenges when applied to code translation. The unique semantics and idiosyncrasies of programming languages make it difficult to specify the right context for translation, risking token overflow or incorrect translation outcomes. Even as LLMs demonstrate the potential to perform chain-of-thought reasoning by conditioning on a few examples, translating entire applications or accommodating third-party libraries and runtime behaviors remains an intricate task beyond the capabilities of traditional transpilation or fine-tuning methods.

SUMMARY

In accordance with an embodiment of the present invention, a computer-implemented method is provided for efficiently translating program code from a source language to a target language. Input source code is parsed, using a processor device, into an Intermediate Representation (IR). A structural and semantic model of the source code are established by applying static analysis to the IR, and a program skeleton of the target code is constructed from the IR, including generating context-aware placeholders. The IR is transformed into a Single Static Assignment (SSA) form, and a System Dependency Graph (SDG) is built from the SSA form. The SDG is traversed to order translation tasks, and ordered tasks are translated into the target language using a Large Language Model (LLM). A translated program is generated by integrating translated code segments into a coherent program structure in the target language.

In accordance with an embodiment of the present invention, a system is provided for efficiently translating program code from a source language to a target language. Input source code is parsed, using a processor device, into an Intermediate Representation (IR). A structural and semantic model of the source code are established by applying static analysis to the IR, and a program skeleton of the target code is constructed from the IR, including generating context-aware placeholders. The IR is transformed into a Single Static Assignment (SSA) form, and a System Dependency Graph (SDG) is built from the SSA form. The SDG is traversed to order translation tasks, and ordered tasks are translated into the target language using a Large Language Model (LLM). A translated program is generated by integrating translated code segments into a coherent program structure in the target language.

In accordance with an embodiment of the present invention, a non-transitory computer readable storage medium including a computer readable program operatively coupled to a processor device is provided for efficiently translating program code from a source language to a target language. Input source code is parsed, using a processor device, into an Intermediate Representation (IR). A structural and semantic model of the source code are established by applying static analysis to the IR, and a program skeleton of the target code is constructed from the IR, including generating context-aware placeholders. The IR is transformed into a Single Static Assignment (SSA) form, and a System Dependency Graph (SDG) is built from the SSA form. The SDG is traversed to order translation tasks, and ordered tasks are translated into the target language using a Large Language Model (LLM). A translated program is generated by integrating translated code segments into a coherent program structure in the target language.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Figure 1:
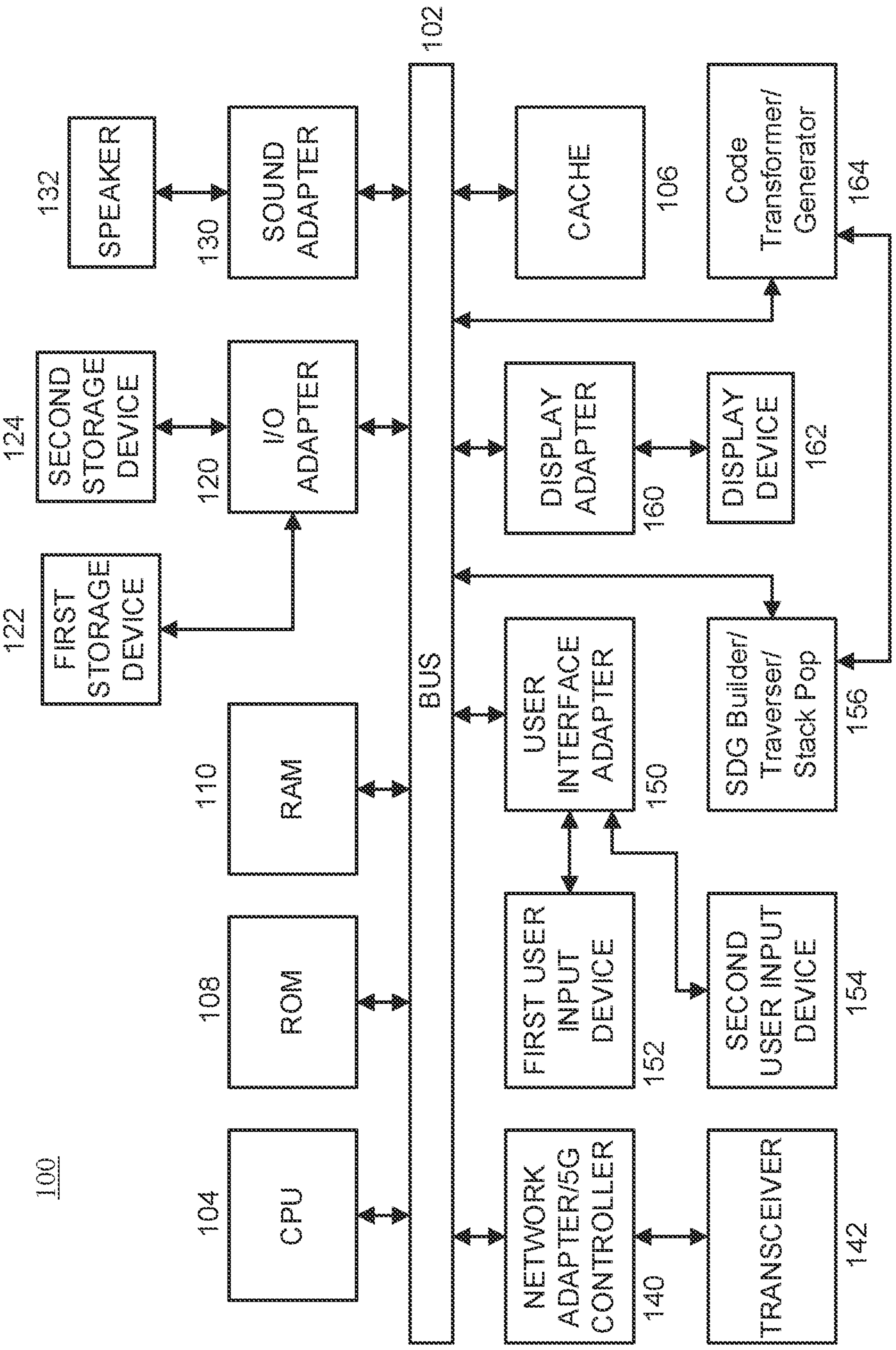
FIG. 1 is a diagram showing an exemplary processing system for code translation to which the present principles may be applied, in accordance with embodiments of the present invention.

In accordance with aspects of the present invention, systems and methods are provided for adaptive neural network-based context aware code translation and optimization.

In various embodiments, the present invention can include a neural network-based system and method for translating programming code, significantly enhancing the accuracy and efficiency of code translation across various programming languages by leveraging state-of-the-art neural network models and sophisticated contextual data processing techniques, in accordance with aspects of the present invention.

The present invention can include an adaptive neural network system, which can seamlessly integrate and process diverse programming languages and contexts. The system incorporates innovative mechanisms for neural network adaptation, employing a dual-structure model that separates network weights into 'locked' and 'trainable' copies. This unique configuration enables the system to finely tune its translation capabilities to specific tasks without compromising the foundational strength and generalizability of the pre-trained models.

In addition to neural network adaptation, the present invention can employ advanced techniques in program analysis, such as the use of Intermediate Representations (IRs) and specialized processing modules. These techniques ensure that the source code is not only accurately translated to the target language but also retains the structural and functional integrity of the original program. The invention addresses and overcomes the challenges typically encountered in conventional code translation methods, such as semantic gaps, readability issues, and the complexities of translating third-party libraries and bespoke APIs.

In conventional practice, the translation of programming code from one language to another typically involves intermediate representations (IRs) such as Single Static Assignment (SSA). While this approach aids in optimizing the code for runtime benefits and simplifies certain compiler optimizations, it often loses high-level constructs, creating a semantic gap that can hinder the translated code's readability and fidelity to the original logic. Additionally, translating entire applications, especially those that involve third-party libraries, remains beyond the capabilities of standard transpilers, and may result in code that is not human-readable or maintainable.

The traditional approach to training neural network models for code generation tasks has relied on converting source code to a standardized IR and fine-tuning models to translate from IR to the target language. Despite the utilization of extensive labeled datasets and iterative gradient updates, this method faces challenges such as the need for large, task-specific datasets, poor generalization, and the exploitation of irrelevant training data features.

Pre-trained Large Language Models (LLMs) brought advancements with their ability to perform in-context learning, adapting to new tasks during inference by conditioning on a few examples. This method has been successful in natural language processing tasks. However, its application to code translation is complicated by the difficulty in specifying context for translation between programming languages, the limited token size processing capacity of LLMs, and the tendency of LLMs to generate hallucinatory or unfaithful output.

In view of these challenges, the present invention improves upon conventional systems and methods by integrating neural network models with advanced contextual data processing strategies. In some embodiments, the invention employs an adaptive system that enhances accuracy and efficiency in code translation by using context-aware neural networks and optimization techniques. This system and method can maintain the integrity of the original code's logic and semantics while optimizing the translated code for the target environment's specific operational conditions and performance needs, in accordance with aspects of the present invention.

In various embodiments, the present invention can be utilized to overcome the limitations of the traditional methods by providing a more robust and contextually intelligent translation process. It leverages the strengths of neural networks for understanding coding structures and patterns and introduces sophisticated context manipulation strategies to achieve high-fidelity translations across various programming languages. The inventive system encapsulates the principles of both 'Frozen and Opaque' and 'Frozen and Translucent' LLMs, utilizing innovative modules like ControlNet for context learning, Prompt Embedding, and Prompt Augmentation to enrich the translation prompts. This comprehensive framework significantly advances the discipline of code translation, offering a solution that is sensitive to the nuances of different programming contexts and capable of delivering optimized code for the target environment, in accordance with aspects of the present invention.

As will be appreciated by one skilled in the art, aspects of the present invention may be embodied as a system, method or computer program product, which can be executed on local and/or remote computing devices. Accordingly, aspects of the present invention may take the form of an entirely hardware embodiment, an entirely software embodiment (including firmware, resident software, micro-code, etc.) or an embodiment combining software and hardware aspects. Furthermore, embodiments of the present invention may take the form of a computer program product embodied in one or more computer readable medium(s) on one or more computing devices having computer readable program code embodied thereon. Embodiments described herein may be entirely hardware, entirely software or including both hardware and software elements. In some embodiments, the present invention is implemented in software, which includes but is not limited to firmware, resident software, microcode, etc., in accordance with aspects of the present invention.

Any combination of one or more computer readable medium(s) may be employed. The computer readable medium may be a computer readable signal medium or a computer readable storage medium. A computer readable storage medium may be, but is not limited to, an electronic, magnetic, optical, electromagnetic, infrared, or semiconductor system, apparatus, or device, or any combination thereof. Other examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. In this document, a computer readable storage medium may be any tangible medium that can contain, or store a program for use by or in connection with a computing system, apparatus, or device.

Program code embodied on a computer readable medium may be transmitted using any suitable medium, including but not limited to wireless, wireline, optical fiber cable, etc., or any combination thereof. Computer program code for carrying out operations for aspects of the present invention may be written in any combination of one or more programming languages, including, but not limited to any general-purpose programing language (e.g., PHP, Java, C++, etc.) and/or domain-specific programing language (e.g., HTML, SQL, etc.), blockchain-specific programming language (e.g., solidity, rust, java, python, etc.). The program code may execute fully on the user's computer/mobile device, partially on the user's computer/mobile device, as stand-alone software, partially on the user's computer/mobile device and partially on a remote computer/mobile device, entirely on a remote computer or server, and/or using blockchain. The remote computer may be connected to the user's computer through any type of network (e.g., a local area network (LAN), wide area network (WAN), a connection to an external computer (e.g., over the Internet using an Internet Service Provider), etc.).

Aspects of the present invention are described below with reference to flowchart illustrations and/or block diagrams of methods, systems and computer program products according to embodiments of the present invention. It is noted that each block of the flowcharts and/or block diagrams, and combinations of blocks in the flowcharts and/or block diagrams, may be implemented by computer program instructions.

These computer program instructions may be sent to a processor of any type of computing system (e.g., general purpose computer, special purpose computer, or other programmable data processing apparatus to produce a machine), such that the instructions, which execute by the processor of the computing system, create a means for implementing the functions/instructions/acts specified in the flowcharts and/or block diagram block or blocks. These computer program instructions may also be stored in a computer readable medium that can instruct any computing device to function in a particular manner, such that the instructions stored in the computer readable medium produce an article of manufacture including instructions which implement the function/instruction/act specified in the flowchart and/or block diagram block or blocks.

The computer program instructions may also be loaded onto a computer, mobile device, other programmable data processing apparatus, or other devices to cause a series of operational steps to be performed on any computing system to produce a computer implemented process such that the instructions which execute on the computer or other programmable apparatus provide processes for implementing the functions/acts specified in the flowcharts and/or block diagram block or blocks.

A computer readable signal medium may include a propagated data signal with computer readable program code embodied therein (e.g., baseband, part of a carrier wave, etc.). Such a propagated signal may take any of a variety of forms, including, but not limited to, electro-magnetic, optical, or any combination thereof. A computer readable signal medium may be any computer readable medium that is not a computer readable storage medium and that can communicate, propagate, or transport a program for use by or in connection with a computing system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems, remote printers, storage devices, blockchain, etc. through intervening private or public networks. Modems, cable modem and Ethernet cards are just a few of the currently available types of network adapters.

The flowchart and block diagrams in the figures illustrate the architecture, functionality, and operation of possible implementations of systems, methods and computer program products according to various embodiments of the present invention. Each block in the flowchart or block diagrams may represent a module, segment, or portion of code, which comprises one or more executable instructions for implementing the specified logical function(s), and in some alternative implementations of the present invention, the functions noted in the block may occur out of the order noted in the figures. For example, two blocks shown in succession may, in fact, be executed substantially concurrently, may sometimes be executed in reverse order, or may be executed in any other order, depending on the functionality of a particular embodiment.

It is also noted that each block of the block diagrams and/or flowchart illustration, and combinations of blocks in the block diagrams and/or flowchart illustration, can be implemented by specific purpose hardware systems that perform the specific functions/acts, or combinations of special purpose hardware and computer instructions according to the present principles.

Referring now to the drawings in which like numerals represent the same or similar elements and initially to FIG. 1, an exemplary processing system 100 for code translation, to which the invention principles may be applied, is illustratively depicted in accordance with embodiments of the present invention. The processing system 100 can include at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, can be operatively coupled to the system bus 102.

A first storage device 122 and a second storage device 124 can be operatively coupled to system bus 102 by the I/O adapter 120. The storage devices 122 and 124 can be any of a disk storage device (e.g., a magnetic or optical disk storage device), a solid-state magnetic device, and so forth. The storage devices 122 and 124 can be the same type of storage device or different types of storage devices.

A speaker 132 can be operatively coupled to system bus 102 by the sound adapter 130. The speaker 132 can be used to provide an audible alarm or some other indication relating to resilient battery charging in accordance with the present invention. A transceiver 142 can be operatively coupled to system bus 102 by network adapter 140. A display device 162 can be operatively coupled to system bus 102 by display adapter 160.

A first user input device 152 and a second user input device 154 can be operatively coupled to system bus 102 by user interface adapter 150. The user input devices 152, 154 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154 can be the same type of user input device or different types of user input devices. The user input devices 152, 154 can be used to input and output information to and from system 100. The system 100 can include a System Dependency Graph Builder/Traverser/Stack Popper in block 156, and a code transformer/translator/generator in block 164, which will be described in further detail herein below, in accordance with aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Moreover, it is to be appreciated that systems 200, 300, 400, 500, 800, 900, 1000, 1100, 1200, and 1300, described below with respect to FIGS. 2, 3, 4, 5, 8, 9, 10, 11, 12, and 13, respectively, are systems for implementing respective embodiments of the present invention. Part or all of processing system 100 may be implemented in one or more of the elements of systems 200, 300, 400, 500, 800, 900, 1000, 1100, and 1200 of FIGS. 2, 3, 4, 5, 8, 9, 10, 11, 12, and 13, respectively.

Further, it is to be appreciated that processing system 100 may perform at least part of the methods described herein including, for example, at least part of methods 200, 300, 400, 500, 600, 700, and 1300 of FIGS. 2, 3, 4, 5, 6, 7, and 13, respectively. Similarly, part or all of systems 200, 300, 400, 500, 800, 900, 1000, 1100, 1200, and 1300 of FIGS. 2, 3, 4, 5, 8, 9, 10, 11, 12, and 13, respectively, may be used to perform at least part of methods 200, 300, 400, 500, 600, 700, and 1300 of FIGS. 2, 3, 4, 5, 6, 7, and 13, respectively.

Figure 2:
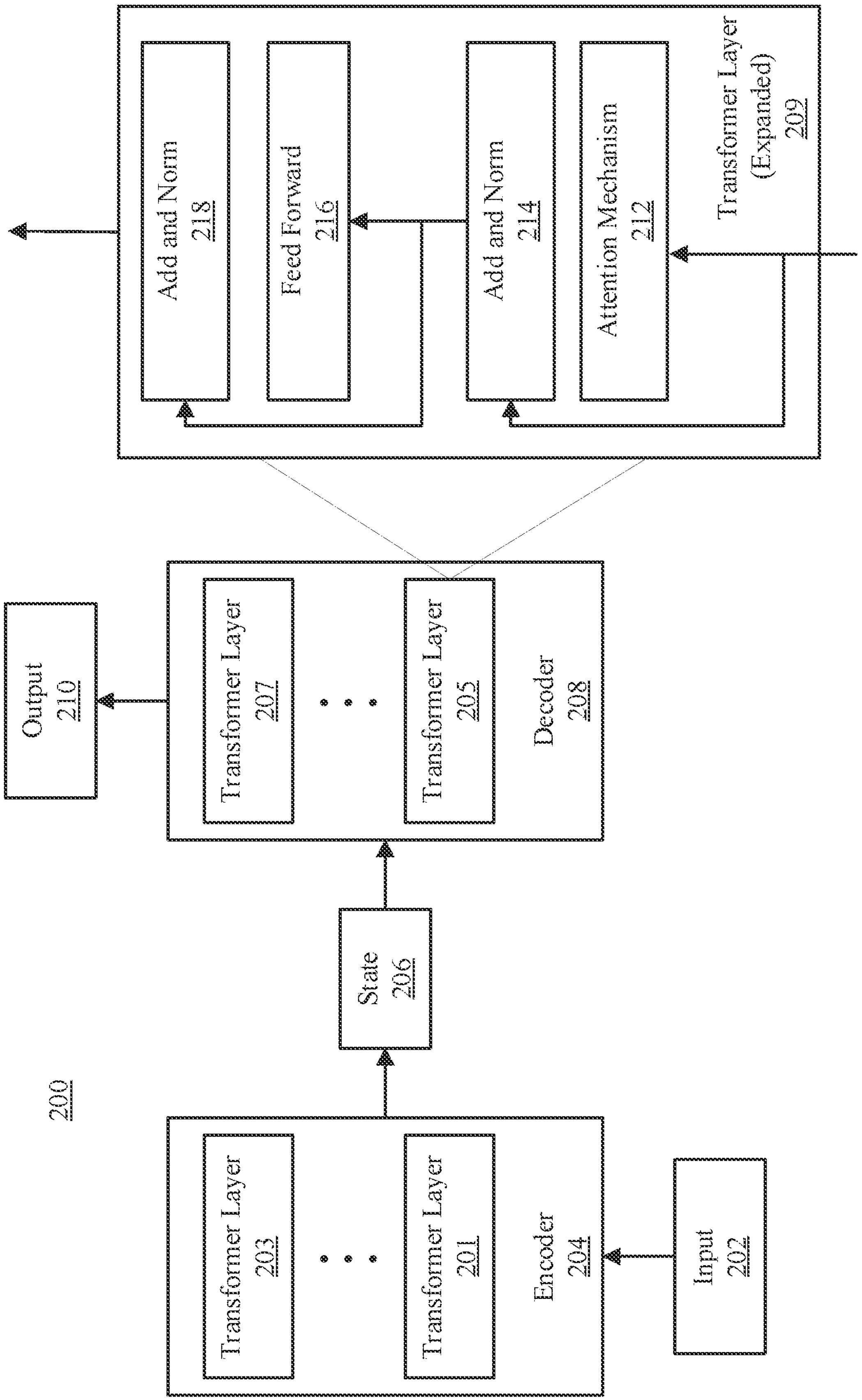
FIG. 2 is a diagram showing a high-level system and method for optimized code translation via a transformer-based neural network utilizing Large Language Models (LLMs), in accordance with embodiments of the present invention.

Referring now to FIG. 2, a diagram showing a high-level transformer-based Neural Network (NN) system and method 200 for optimized code translation using Large Language Models (LLMs), is illustratively depicted in accordance with embodiments of the present invention.

In various embodiments, in block 202, the input can represent initial code (or other types of data) that is to be translated. Such input 202 can be of any of a plurality of types of programming languages, in accordance with aspects of the present invention. Here, the source code can be tokenized into a format that the neural network can effectively process, transforming raw code into a structured sequence of tokens that encapsulate both syntax and semantics. At this stage, the code may not be merely raw text, but a carefully tokenized array of data points, each representing discrete, identifiable elements of the programming language from which the system can glean semantic and syntactic meaning.

Following the input in block 202, an encoder 204 can be utilized to process the input 202. The encoder 204 may not be a single entity but rather a composite of multiple Transformer Layers 203, . . . , 205, can serve as a backbone of the transformer-based architecture. Their role can be to dissect the input into its constituent parts, and applying a self-attention mechanism to ascertain the context and relationships within the input sequence. Each layer 203, . . . , 205 can refine this understanding, passing on a richer, more context-aware representation to the next, culminating in a comprehensive encoded state.

In some embodiments, in block 206, the state can capture the essence of the source code as understood by the encoder. It can be a distilled representation, a vector that embodies the collective understanding of the code's structure and intent, informed by the layers of attention and analysis it has undergone. This state can be a bridge between the input's 202 raw complexity and the output's 210 anticipated clarity. The state 706 can be the encoded version of the input, enriched with contextual information that flows from the encoder to the decoder. This state can serve as a comprehensive representation of the source code, carrying all necessary information for accurate translation.

In various embodiments, the decoder in block 208, can mirror the encoder in structure but not in function. The decoder 208 can include a fresh stack of transformer layers 205, . . . , 207, where each layer can perform the dual task of decoding the state into the target language and refining the output in real-time. The decoder layers can incorporate cross-attention modules, which can enable the system to juxtapose the source code's context against the emergent translation, ensuring that each new token produced is in harmony with what came before, in accordance with aspects of the present invention. The decoder in block 208 can mirror the encoder's structure but with additional mechanisms to attend to the encoder's output. It can progressively construct the target sequence (the translated code). The decoder layers, including the attention mechanism 212 and feed-forward networks 216, can generate predictions for each token of the output sequence based on both the encoder's representations and what has been generated so far.

In some embodiments, the culmination of this process can be the output in block 210. This is the tangible result of the system's processes, including, for example, outputting a sequence of tokens now forming the translated code. This output can be the decoder's 208 final word, a piece of code transformed into a new language, etc., which can then be compiled, executed, or further refined. The output 210 can include a sequence of tokens that represents the code in the target language, generated by the decoder 208. This output 210 can result in a syntactically and semantically accurate translation of the input code, in accordance with aspects of the present invention.

In accordance with various embodiments, an expanded view 209 of the transformer layers 201, 203, 205, 207, illustratively depicts the inner workings of both the encoder 204 and decoder 208 layers. This detailed breakdown reveals further details of the transformer layers 201, 203, 205, 207, which can include the Attention Mechanism 212, Add & Norm functions 214, 218, and Feed Forward networks 216. Each function within this microcosm can contribute to the transformation of the encoded state into a translated sequence.

The Attention Mechanism 212 within these layers can be the core of the transformer model, which can enable the network to focus on and weigh different parts of the input sequence. This mechanism is important for code translation, where dependencies can span far across the sequence, and understanding context is key to maintaining the integrity of the translation. This component further can enable the model to focus on different parts of the input sequence when predicting each token of the output sequence. For code translation, this can mean that the attention mechanism helps the model to align code segments with their corresponding translations, considering dependencies that might span across the entire codebase.

The Add & Norm functions 214, 218 can be the layers' mechanisms for stabilizing the outputs, ensuring that the values do not escalate to extremes and that the gradients do not vanish or explode, which is a common problem in deep neural networks. The Add and Norm functions 214, 218 can apply a residual connection followed by layer normalization. This process helps in stabilizing the learning and allows for deeper networks by mitigating the vanishing gradient problem.

In some embodiments, the Feed Forward networks 216 can represent a series of linear transformations with activation functions, which can serve to process the data sequentially, translating the complex relationships and patterns recognized by the attention mechanism into a new representation suitable for output generation. The feed-forward networks 216 can further transform the output of the attention mechanism before passing it on to the next layer or generating an output token in the case of the decoder, in accordance with aspects of the present invention.

This transformer-based neural network architecture, enhanced by the vast knowledge and context-awareness provided by LLMs, represents a significant leap in the field of code translation. The architecture is meticulously designed to translate code not just accurately, but with an understanding of its broader context, facilitated by the LLMs' expansive pre-training on vast corpora of code in various programming languages. This system is adaptable, capable of both direct translation and further refinement through prompt tuning and fine-tuning, leveraging the LLM's ability to learn from examples and improve upon its translations. The transformer-based neural network, therefore, stands as a robust, sophisticated solution for the complex task of code translation, in accordance with aspects of the present invention.

In various embodiments, when integrated with a LLM, the transformer's architecture leverages the massive amount of parameters and the pre-training on extensive code corpora. The LLM, having learned patterns, structures, and the semantics of multiple programming languages, guides the transformer network's training process for the specific task of code translation. The LLM's pre-trained knowledge base significantly enhances the transformer's ability to understand and translate complex code constructs by providing it with a broad understanding of programming language syntax and semantics. The combination of the transformer's structure with the LLM's extensive pre-training enables more accurate and contextually relevant code translations than would be possible with either component alone.

In the complete translation process, the source code is first tokenized and passed through the encoder. The encoder's output then serves as a guide for the decoder, which generates the translated code. Throughout this process, the LLM's pre-trained knowledge aids in accurately predicting tokens that are semantically correct and syntactically valid in the target programming language.

The LLM's ability to provide in-context learning, in which it can understand and generate code based on a few examples, can be particularly beneficial in that it allows for few-shot learning, where the model can effectively translate even with a limited number of examples from the source and target languages. This is at least in part due to the transformer's capacity to leverage the extensive contextual understanding built into the LLM. Overall, the combination of transformer architecture with a LLM creates a powerful model for translating code, capable of capturing and utilizing the intricacies of programming languages to produce accurate and efficient translations, in accordance with aspects of the present invention.

Figure 3:
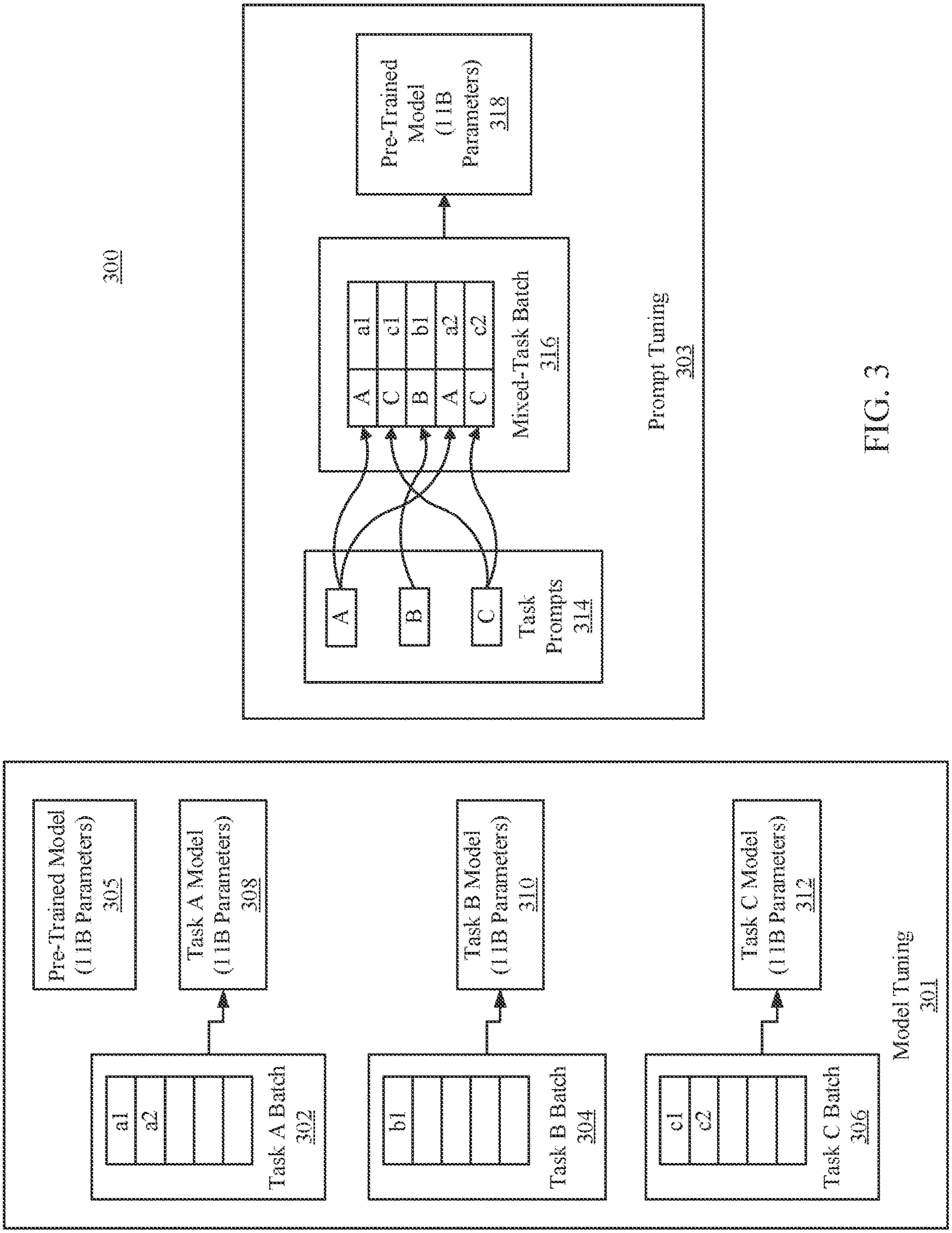
FIG. 3 is a diagram showing systems and methods for model tuning and prompt tuning in language model training for neural network-based code translation, in accordance with embodiments of the present invention.

Referring now to FIG. 3, a diagram showing a systems and methods 300 for model tuning and prompt tuning in language model training for neural network-based code translation, is illustratively depicted in accordance with an embodiment of the present invention. FIG. 3 illustrates two distinct methodologies for adapting a pre-trained neural network model with 11 billion parameters (11B params) to perform specific tasks, in accordance with aspects of the present invention.

In various embodiments, block 301 depicts a model tuning approach where separate models are trained for different tasks and distinct models are calibrated individually for specific tasks, each utilizing a full set of the pre-trained model's parameters. In block 303 a prompt tuning approach is depicted, which streamlines the adaptation process by tuning a small subset of the model's parameters for various tasks, as will be described in further detail herein below, in accordance with aspects of the present invention.

In various embodiments, the model tuning in block 301 can include task specific batches for processing. Blocks 302, 304, and 306 represent batches of task-specific data for tasks A, B, and C, respectively. Each batch contains distinct examples for illustrative purposes, including a1 and a2 for task A Batch 302, b1 for task B Batch 304, and c1 and c2 for Task C Batch 306, which can be used to fine-tune dedicated instances of a neural network model, in accordance with aspects of the present invention.

Block 302 illustrates the dataset for Task A, containing unique examples a1, a2 that represent the specific nuances and requirements of Task A. The data within this batch can be curated to encapsulate the diversity of the programming scenarios Task A is expected to encounter. Similarly, block 304 can be populated with data examples b1 for Task B, which reflect the distinct characteristics and challenges associated with this particular translation task. Block 306, reserved for Task C, includes examples c1, c2, ensuring that the dataset comprehensively represents the breadth of Task C's domain, which can provide a robust training ground for the model dedicated to this task.

It is to be appreciated that although three (3) batches are shown for simplicity of illustration, any number of batches can be employed in accordance with various embodiments of the present invention.

In various embodiments, a pre-trained machine learning model, characterized by eleven billion parameters is illustratively depicted in block 305. This extensive parameterization enables the model to have a broad foundational knowledge base suitable for a wide array of tasks. The pre-trained model can serve as a starting point for further task-specific tuning processes. Its architecture can be highly adaptable, allowing for subsequent refinements through both model tuning and prompt tuning techniques. The model is capable of understanding and processing complex data patterns, and can assist in enabling the system's ability to perform specialized tasks post-tuning. Blocks 308, 310, and 312 illustrate the independent task-specific models for tasks A, B, and C, post-tuning. The task specific models 308, 310, and 312, labeled as Task A Model, Task B Model, and Task C Model respectively, can represent the outcomes of the model tuning process. Each model, now fine-tuned, can embody the intricacies of its respective task, and can be optimized to perform with high fidelity within its specified domain. Notably, these models can retain the full parameter set of the original pre-trained model but can be optimized for their respective tasks, in accordance with aspects of the present invention.

In various embodiments, prompt tuning in block 303 can streamline the adaptation process by tuning a small subset of the model's parameters for various tasks, in accordance with aspects of the present invention. Block 314 depicts a mixed-task batch that can combine data samples from all tasks, serving as a comprehensive input for the pre-trained model during the prompt tuning process. Block 316 presents the innovative prompt embedding strategy in which prompt tokens can be concatenated with a set of tunable context tokens, creating an enriched input that can be processed by the pre-trained model. This technique can enable the model to retain its vast parameter set while being fine-tuned for task-specific outputs, and can provide a more efficient utilization of the pre-trained model's knowledge by selectively tuning a subset of parameters relevant to each task.

In some embodiments, at the center of the prompt tuning strategy, block 314 presents a mixed-task batch, an aggregation of examples from all tasks A, B, and C. This approach can leverage the diversity of the collective dataset to inform the prompt tuning process. Advancing the technique, block 316 can include performing prompt embedding, where each task's prompt tokens can be merged with a tunable set of context tokens. This enriched input can dynamically interact with the pre-trained model's parameters 318, guiding the model's output towards the desired translation task objectives. In block 318, the 'Pre-Trained Model (11B Parameters)' can function as an advanced processing unit capable of fine-tuning its responses based on a diverse array of input signals. This block can interact with the 'Mixed-Task Batch 316', receiving a compilation of various task prompts that are designed to guide the model through a specialized tuning procedure. During this prompt tuning phase, the model can dynamically adjust its internal parameters, which can be represented by the 11 billion parameter count, to enhance its ability to interpret and process the intricate nuances of the mixed-task inputs. The interaction between the pre-trained model and the task prompts can provide a refined translation of the source code into the target language, leveraging the extensive pre-training to accommodate a broad spectrum of programming tasks and ensuring a high degree of accuracy and contextual relevance in the output. The model 318 can maintain its original extensive parameter set but can demonstrate increased performance with fewer resource requirements in task-specific performance through the updated context tokens, in accordance with aspects of the present invention.

Figure 4:
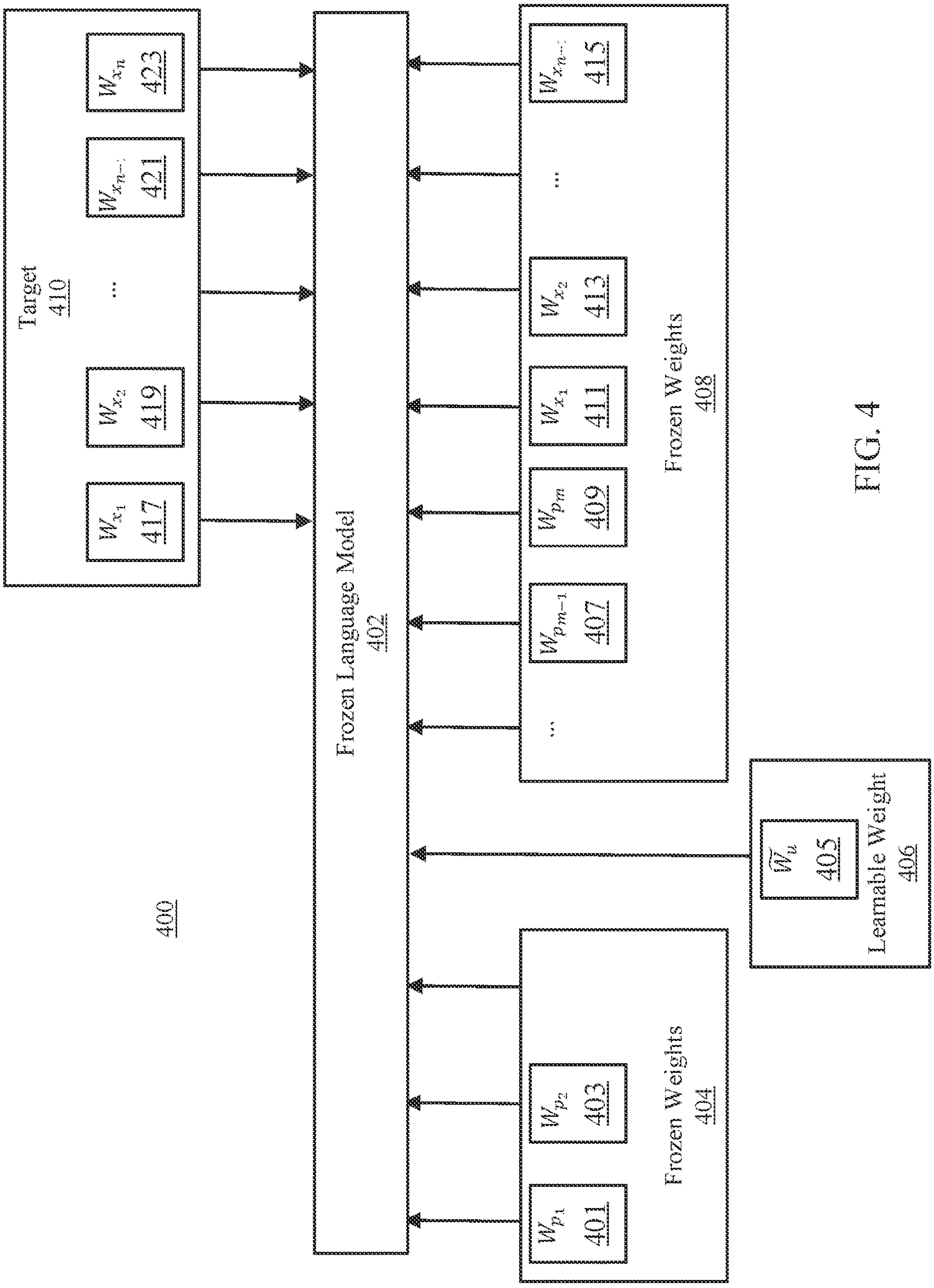
FIG. 4 is a diagram showing a system and method using an exemplary frozen language model with frozen weights and learnable weights for effective code translation, in accordance with embodiments of the present invention.

Referring now to FIG. 4, a diagram showing a system and method 400 using an exemplary frozen language model with frozen weights and learnable weights for effective code translation, is illustratively depicted in accordance with an embodiment of the present invention.

In various embodiments, a Frozen Language Model 402 can be utilized for code translation tasks. In this embodiment, the language model (LM) 402 can be pre-trained with a set of parameters that are fixed, or "frozen", to retain its initial training on a large corpus of data. The fixed parameters are indicated by the numerals 404 and 408, which denote the frozen weights of the LM 402.

The LM 402 can interface with a target 410, which can represent the expected output of the language model. This output can be generated after processing input data through the model, with the target being a sequence of tokens in a programming language. In some embodiments, a learnable weight 405 can be included within the model, and can be uniquely identified and adjustable. This weight represents a parameter that can be fine-tuned to adapt the LM's 402 output to specific requirements of a translation task, even when the rest of the model's weights remain unchanged. This fine-tuning can enable for a degree of customization and adaptability without the need for retraining the entire model, thus saving on computational resources and time, in accordance with aspects of the present invention.

In various embodiments, each input parameter 401, 403, 405, 407, 409, 411, 413, 415 can represent the embedding of input tokens, which can be processed by the frozen weights of the LM 402. These parameters can be utilized by the model to interpret and convert the input data into a form that can be processed to generate the desired output. The weights $W_{p1}$, $W_{p2}$, . . . . $W_{pm\text{-}1}$, $W_{pm}$, $W_{x1}$, $W_{x2}$, . . . . $W_{n\text{-}:}$, represented by blocks 401, 403, 407, 409, 411, 413, and 415, respectively, can be pre-established parameters of the LM that encode linguistic information. Since they are "frozen," these weights do not undergo further modification and maintain the learned representations. Each of these parameters corresponds to a specific token from the input prompt that is fed into the LM. They can be embedded into a vector space by the model, which allows the LM to process and understand the input.

In practice, the LM can take input tokens, process them through the frozen weights 404, 408, and with the aid of the learnable weight Wu 405 can produce an output that is a translated version of the input data. This weight 405 can be adjusted during the prompt tuning process to better align the model's outputs with specific translation tasks without affecting the integrity of the rest of the model. This output can be represented by the sequence of weights 417, 419, 421, 423 leading to the target 410. These weights can correspond to the final layer of the model that shapes the translated sequence into its final form. These weights associated with the output layer of the LM can be utilized for generating the final translated output by transforming the processed information from the LM's internal layers into a structured sequence that corresponds to the target language.

The configuration of the LM 402 as shown in FIG. 4 allows for the effective translation of code by leveraging the general knowledge of the pre-trained model while also providing the flexibility to incorporate task-specific nuances through the learnable weight 405. This represents a significant innovation in the field of machine learning and language processing, enabling more accurate and contextually relevant translations without the overhead of retraining the model from scratch.

In various embodiments, The interplay of these components can include input tokens being represented by their corresponding weights (e.g., 401, 403, 407, etc.), which can be fed into the LM 402. The LM 402 can process these inputs using its frozen weights to generate an internal representation of the input data. The learnable weight 406 can be utilized to fine-tune the model's response to specific input prompts, enhancing the accuracy of the output without altering the fundamental knowledge encoded by the frozen weights. In some embodiments, next the LM 402 can produce an output sequence, which can be the translation of the input prompt into the target language. This sequence can be represented by the output weights represented by blocks 417, 419, 421, and 423, which can also be a part of the model's frozen parameters, ensuring that the translation adheres to the syntactic and semantic structure of the target language, in accordance with aspects of the present invention.

Figure 5:
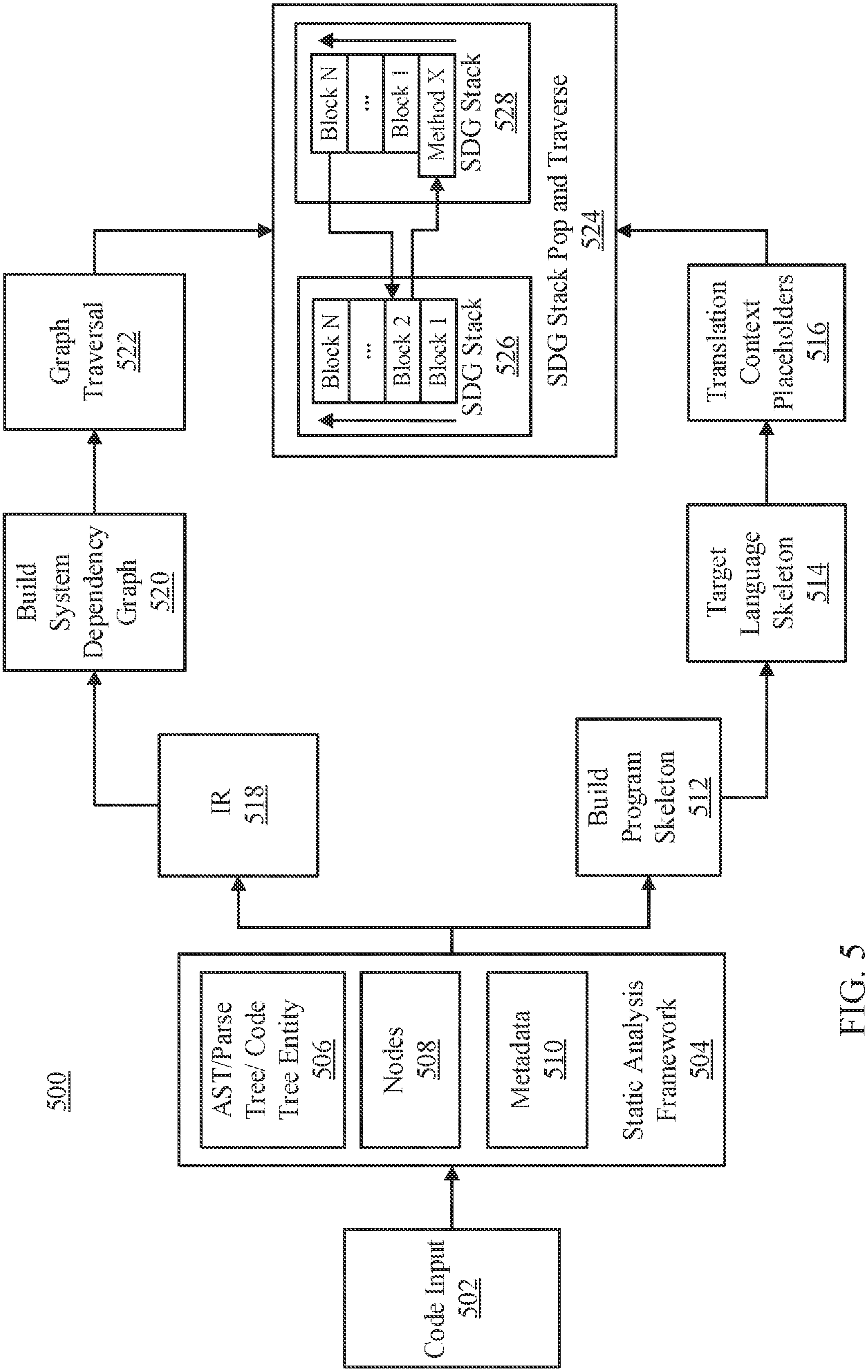
FIG. 5 is a diagram showing a system and method for neural network-based translation of programming code utilizing an IR and standardizing the source code for precise translation by a language model, in accordance with embodiments of the present invention.

Referring now to FIG. 5, a diagram showing a system and method 500 for neural network-based translation of programming code utilizing an IR and standardizing the source code for precise translation by a language model, is illustratively depicted in accordance with an embodiment of the present invention.

In various embodiments, in block 502, code can be input for processing, and can represent the raw source code that is to be translated. This code can be processed through static analysis to discern its structure and semantics before it is fed into the translation framework. This block is the repository of the raw code that will undergo translation, and can include the necessary instructions, declarations, and constructs that define the program's operational logic and functionality in its original language. In block 504, a static analysis framework can be utilized for processing the raw source code from block 502. This framework can apply static analysis techniques to parse the code, constructing an Intermediate Representation (IR) that abstracts away the high-level language specifics and distills the code into a form that can be systematically analyzed and manipulated. Block 506 introduces a static analysis tool framework (e.g., Abstract Syntax Tree (AST) Framework, Parse Tree, Code Tree, WALA Cast entity, etc.), which can represent an abstraction layer that converts the input code into an Intermediate Representation (IR) using the static analysis tool framework, noting that the above-mentioned frameworks are presented illustrative purposes, and that other similar frameworks can be employed in accordance with aspects of the present invention. This entity 506 can be utilized for understanding the source language's syntax and semantics, and it can facilitate the extraction of structural and behavioral patterns within the code.

In various embodiments, in block 508, nodes can be derived from the static analysis entity 506. These nodes 508 can represent the essential elements of the program's control flow and data structures, broken down into granular components that can be individually analyzed and translated. In block 510, metadata can be utilized in conjunction with the nodes, providing additional information about each node, including, for example, data types, scope, and variable dependencies. This metadata can be utilized for ensuring that the translated code preserves the functionality and logic of the original code.

In block 512, a program skeleton can be built using the Nodes 508 and Metadata 510 to construct a skeletal version of the target program. This skeleton can form the blueprint for the translated code, and can include placeholders for logic and data that can be filled in by the LLM. The Target Language Skeleton in block 514 can represent the structured format of the translated code as it begins to take shape. Here, the foundational elements of the target program can be laid out, ready to be populated with actual code generated by the LLM. In block 516, Translation Context Placeholders can be strategically positioned within the Target Language Skeleton 514. These placeholders can be filled with contextually relevant code snippets, ensuring that the translation is not only syntactically correct but also functionally equivalent to the original code, in accordance with aspects of the present invention.

In various embodiments, in block 518, an Intermediate Representation (IR) can be utilized, and in some embodiments can be enhanced by converting an IR into a Single Static Assignment (SSA) IR form, which can simplify the translation by providing a clear and unambiguous representation of variable assignments and dependencies, in accordance with aspects of the present invention. In block 520, a System Dependency Graph (SDG) can be generated, and can map out the dependencies within the code, providing a visual representation of the execution flow and data relationships. This graph can be utilized to ensure the logical coherence of the translated code.

In block 522, graph traversal can be executed by methodically navigating the SDG, which can identify the sequence in which code segments (e.g., basic blocks) should be translated, ensuring that the translated code reflects the intended behavior of the original program. Block 524 shows the 'SDG Stack Pop and Traverse' action, where the basic blocks identified during the graph traversal can be sequentially processed for translation. This step can be utilized for maintaining the order and dependencies of the program's components. Blocks 526 and 528 represent the SDG Stacks, which can be dynamic structures that hold the basic blocks of code as they are processed. The stack can be utilized to ensure that each block is translated in the correct order, and once translated, the blocks can be pushed back into the program stack to rebuild the target program, in accordance with aspects of the present invention.

In various embodiments, the system 500 ensures that the translated code blocks maintain syntactic and semantic integrity during code translation. The stack management can be dynamic, allowing for the repopulation of the stack with translated segments, which can then be integrated back into the target program stack. This management can be utilized for preserving the original program structure and ensuring functional correctness.

In some embodiments, the described framework can be source and language agnostic, meaning the entity and the contextual information provided to the LLM can be uniform and replicable across different programming languages. The use of static analysis produces verifiable translation guarantees for large codebases, offering determinism and functional correctness in the translated code. By building a system dependency graph and traversing it to produce concrete and deterministic translation units, the framework can provide an analog to chain-of-thought reasoning that is pragmatically derived, enriching the IR with additional translation context. This framework, as illustrated in FIG. 5, represents an inventive approach to code translation, utilizing the capabilities of LLMs to manage the complexities of programming languages while ensuring that the translated code adheres to the functional equivalence of the original code, in accordance with aspects of the present invention.

Figure 6:
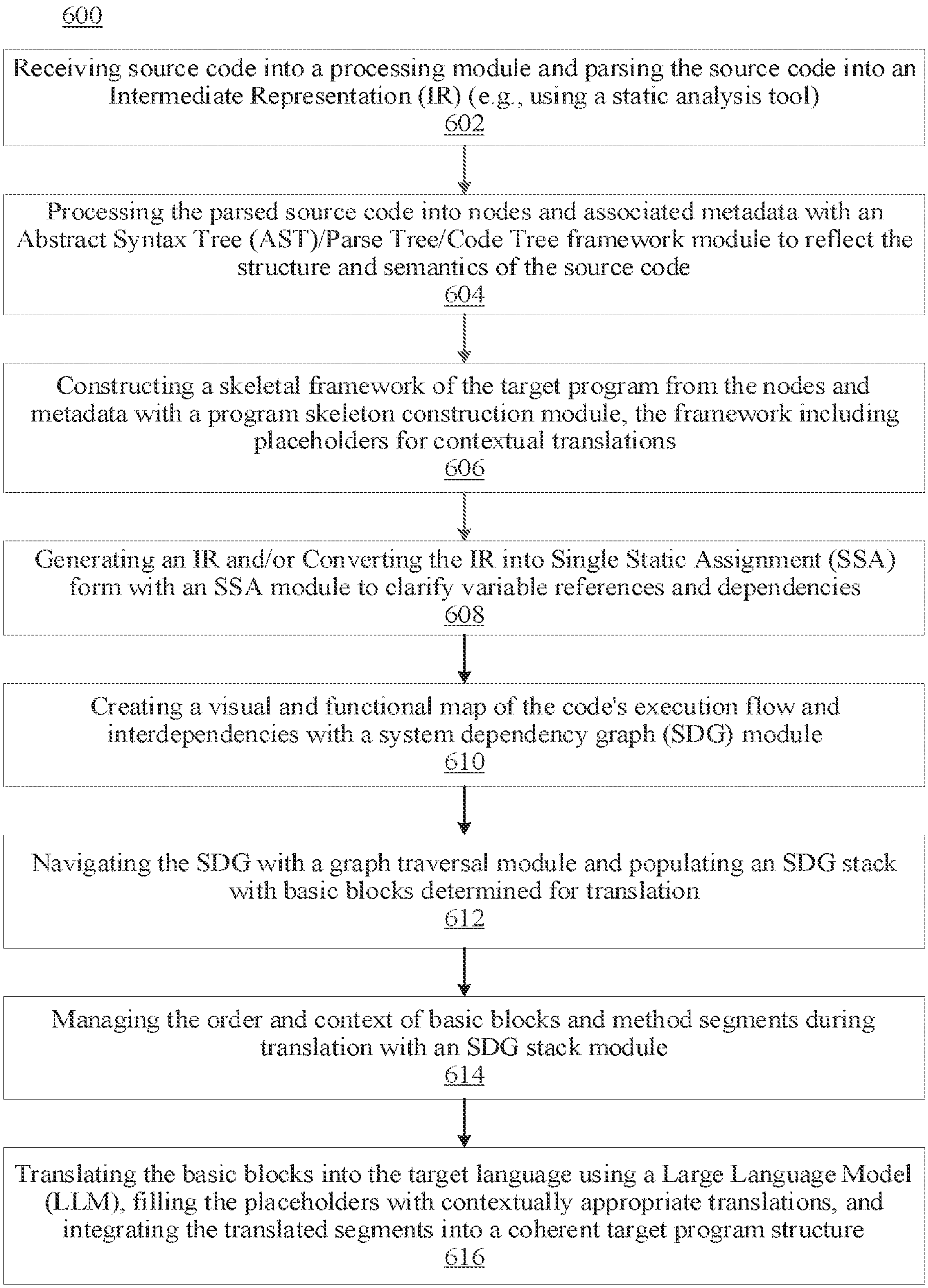
FIG. 6 is a block/flow diagram showing a method for neural network-based code translation utilizing a Large Language Model (LLM), in accordance with embodiments of the present invention.

Referring now to FIG. 6, a block/flow diagram showing a method 600 for neural network-based code translation utilizing a Large Language Model (LLM), is illustratively depicted in accordance with an embodiment of the present invention.

In various embodiments, in block 602, source code can be received into a processing module for analysis and processing. This can include initiating the translation process, feeding the source code into the system, and utilizing a static analysis tool. The tool parses the source code into an Intermediate Representation (IR), an important step that dissects the source code to identify its syntactic and semantic features. This detailed analysis of the source code's structure and meaning can be critical for ensuring accurate translation in later stages. In block 604, the processing system advances to manage the parsed source code, and can convert it into nodes (e.g., Cast nodes, function call nodes, control flow nodes, assignment nodes, etc.) and associated metadata. This task can be performed using a static analysis tool framework (e.g., Abstract Syntax Tree (AST) Framework, Parse Tree, Code Tree, WALA Cast entity, etc.), which can represent an abstraction layer that converts the input code into an Intermediate Representation (IR) using the static analysis tool framework, noting that the above-mentioned frameworks are presented illustrative purposes, and that other similar frameworks can be employed in accordance with aspects of the present invention. This framework can analyze the IR and can derive nodes using the static analysis entity, where each node represents a distinct code element such as a variable, function, or control structure. Additionally, metadata can be associated with each node, detailing the type, scope, and interrelationships of the code elements within the source code. This detailed metadata can be vital for maintaining the logical and functional properties of the source code during the translation process.

In various embodiments, in block 606, a skeletal framework of the target program can be constructed from these nodes and metadata using a program skeleton construction module. This can include assembling a bare-bones structure of the target program that maps out the essential architecture and flow of the source code, incorporating placeholders within this skeleton that mark locations for context-driven code insertion, and ensuring that this framework serves as a guide for the subsequent translation tasks to populate with the target language code. In various embodiments, in block 608, an Intermediate Representation (IR) can be utilized, and in some embodiments can be enhanced by converting an IR into a Single Static Assignment (SSA) IR form with an SSA module. This can include transforming the detailed IR into SSA form to streamline the translation process, in which the SSA form can simplify the IR by ensuring each variable is assigned once, thus resolving ambiguities and facilitating a more straightforward translation by the LLM, and setting up the SSA form as a clean slate for the LLM to perform its translation functions, in accordance with aspects of the present invention.

In some embodiments, in block 610, a visual and functional map of the code's execution flow and interdependencies with a system dependency graph (SDG) module. This can include utilizing the IR or the SSA IR form to build an SDG that visually represents the execution flow of the source program, capturing all functional dependencies and control structures to guide the translation process, and ensuring the SDG accurately reflects the program's execution logic to inform the correct sequencing of translation tasks, in accordance with aspects of the present invention. In block 612, the SDG can be navigated by graph traversal, and an SDG stack can be populated with basic blocks determined for translation. This can include algorithmically traversing the SDG to identify the sequence in which the program's basic blocks will be translated, populating the SDG stack with these blocks, which can represent individual units of functionality within the source code, and queuing the blocks for translation in a manner that preserves the integrity of the original program's control flow, in accordance with aspects of the present invention.

In block 614, the order and context of basic blocks and method segments can be managed and controlled during translation with an SDG stack module. This can include dynamically adjusting the SDG stack as blocks are translated and integrated back into the target program structure, overseeing the contextual integrity of each translated block to ensure the target program remains functionally coherent, and applying a methodical approach to the reintegration of translated segments to maintain the program's original execution logic.

In block 616, the basic blocks can be translated into the target language using a Large Language Model (LLM). This can include deploying the LLM to interpret and translate each basic block from the source language into the target language, utilizing contextually appropriate placeholders within the program skeleton to guide the LLM in generating functionally equivalent code, and integrating the translated segments into the coherent target program structure, where the LLM can leverage additional context and runtime dependencies from the source code environment to enhance the translation's accuracy and functional correctness, in accordance with aspects of the present invention.

Figure 7:
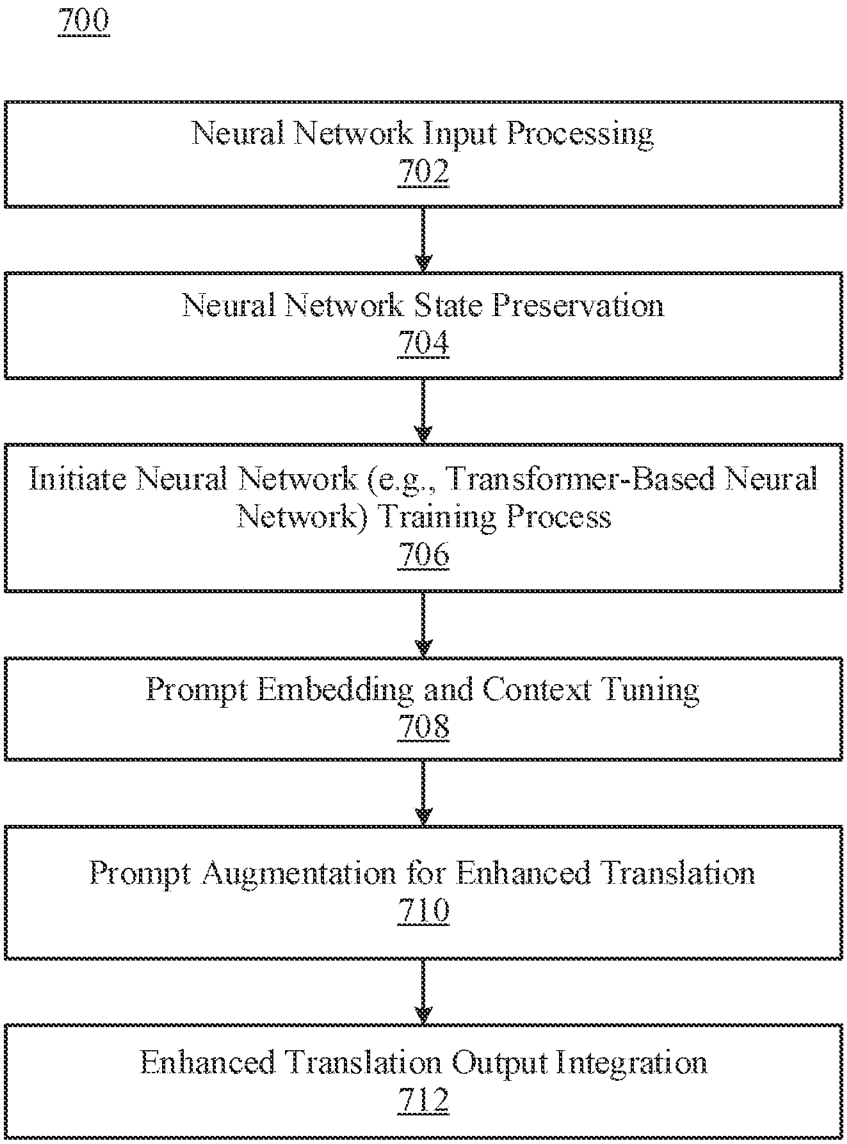
FIG. 7 is a block/flow diagram showing a method for neural network-based code translation, including generation of a target language skeleton, in accordance with embodiments of the present invention.

Referring now to FIG. 7, a block/flow diagram showing a method 700 for neural network-based code translation, including generation of a target language skeleton, is illustratively depicted in accordance with an embodiment of the present invention.

In accordance with aspects of the present invention, this method 700 can harness the power of advanced neural network techniques coupled with strategic contextual data processing. It can integrate the distinct methodologies of 'Frozen and Opaque' as well as 'Frozen and Translucent' Large Language Models (LLMs), with sophisticated context manipulation strategies. The result is a robust system and method 700 capable of delivering high-fidelity translations across a diverse array of programming languages, addressing the nuanced demands of software development and computational linguistics.

In various embodiments, in block 702, a neural network block, which represents a pre-configured neural network architecture, can be engaged to begin the translation process.

The network can be in a 'frozen' state, meaning that its weights are set and unchangeable, ensuring the stability and predictability of the initial translation mechanism. An input signal (e.g., x) can be received and methodically processed through the network, yielding an output (e.g., y). This output can mirror the original model's condition prior to any adaptation, serving as a baseline for the ensuing transformation.

In block 704, the integrity of the neural network model can be protected and maintained. In its 'locked' state, the neural network can receive the same input 'x', and can now be subjected to a newly introduced context signal (e.g., c), which can be extracted from a repository of statically derived context data. The integration of this context signal with the input can initiate a sophisticated chain-of-thought reasoning within the LLM. This process can be utilized for accurate and efficient adapting of the model's capabilities to the specific nuances of the particular translation tasks performed. In block 706, a Neural Network (NN) training process can be initiated, which in various embodiments can include utilizing a transformer-based NN for LLM processing, as described in further detail with reference to FIG. 2 above, in accordance with aspects of the present invention.

In various embodiments, in block 708, prompt embedding and context tuning can be initiated. This can include the amalgamation of original input prompts with a carefully curated set of context tokens. These tokens can traverse the LLM's processing pathways as standard inputs but can further be uniquely engineered to undergo selective training, in accordance with aspects of the present invention. Such training can be configured such that it adjusts only the parameters associated with the context tokens, thereby refining the LLM's prompt responses without modifying the core neural network weights. In block 710, prompt augmentation for enhanced translation can be performed. This can include weaving an extensible vocabulary of out-of-dictionary or non-natural language tokens into the standard prompt structure. This augmentation can significantly broaden the descriptive power of the prompts, furnishing the LLM with a deeper and more nuanced understanding of the coding context, resulting in a marked improvement in the fidelity and precision of the code translation process.

In block 712, the output from the advanced prompt augmentation in block 710 can be captured and integrated by consolidating the augmented prompts' output (e.g., code segments translated with an enriched understanding of both the source and target languages). The output can be a translated code that not only syntactically converts from the source to the target language but is also semantically rich, thus considering the intricacies and contexts of programming paradigms. This translated code can be integrated into the target program environment, ensuring that the translated application behaves as intended in its new ecosystem, reflecting the original program's logic, performance expectations, and operational dependencies, in accordance with aspects of the present invention.

Figure 8:
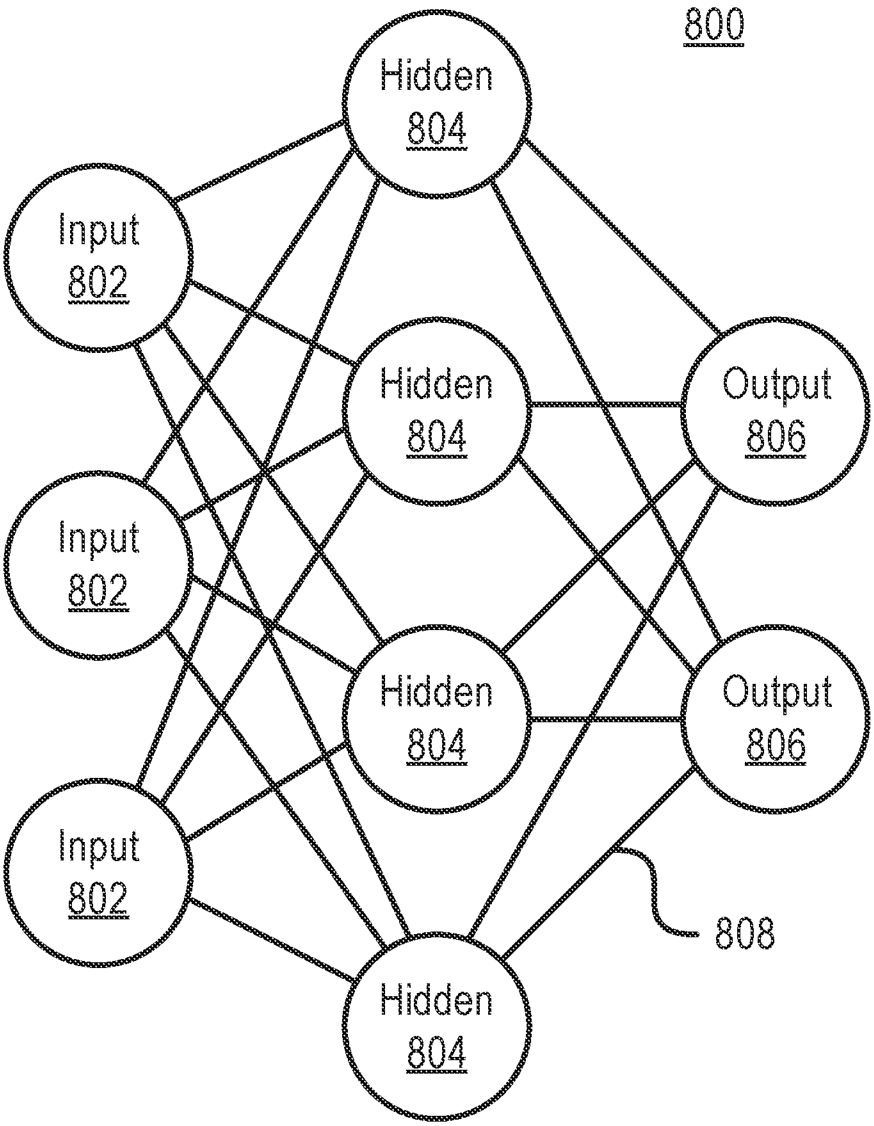
FIG. 8 is a generalized diagram showing an exemplary neural network system for neural network-based context aware code translation and optimization, in accordance with embodiments of the present invention.

Referring now to FIG. 8, a generalized diagram showing an exemplary neural network system 800 for neural network-based context aware code translation and optimization, is illustratively depicted in accordance with an embodiment of the present invention.

An artificial neural network (ANN) is an information processing system that is inspired by biological nervous systems, such as the brain. One element of ANNs is the structure of the information processing system, which includes a large number of highly interconnected processing elements (called "neurons") working in parallel to solve specific problems. ANNs are furthermore trained using a set of training data, with learning that involves adjustments to weights that exist between the neurons. An ANN is configured for a specific application, such as pattern recognition or data classification, through such a learning process.

Although a specific structure of an ANN is shown, having three layers and a set number of fully connected neurons, it should be understood that this is intended solely for the purpose of illustration. In practice, the present embodiments may take any appropriate form, including any number of layers and any pattern or patterns of connections therebetween.

ANNs demonstrate an ability to derive meaning from complicated or imprecise data and can be used to extract patterns and detect trends that are too complex to be detected by humans or other computer-based systems. The structure of a neural network is known generally to have input neurons 802 that provide information to one or more "hidden" neurons 804. Connections 808 between the input neurons 802 and hidden neurons 804 are weighted, and these weighted inputs are then processed by the hidden neurons 804 according to some function in the hidden neurons 804. There can be any number of layers of hidden neurons 804, and as well as neurons that perform different functions. There exist different neural network structures as well, such as a convolutional neural network, a maxout network, etc., which may vary according to the structure and function of the hidden layers, as well as the pattern of weights between the layers. The individual layers may perform particular functions, and may include convolutional layers, pooling layers, fully connected layers, softmax layers, or any other appropriate type of neural network layer. Finally, a set of output neurons 806 accepts and processes weighted input from the last set of hidden neurons 804.

This represents a "feed-forward" computation, where information propagates from input neurons 802 to the output neurons 806. Upon completion of a feed-forward computation, the output is compared to a desired output available from training data. The error relative to the training data is then processed in "backpropagation" computation, where the hidden neurons 804 and input neurons 802 receive information regarding the error propagating backward from the output neurons 806. Once the backward error propagation has been completed, weight updates are performed, with the weighted connections 808 being updated to account for the received error. It should be noted that the three modes of operation, feed forward, back propagation, and weight update, do not overlap with one another. This represents just one variety of ANN computation, and that any appropriate form of computation may be used instead.

To train an ANN, training data can be divided into a training set and a testing set. The training data includes pairs of an input and a known output. During training, the inputs of the training set are fed into the ANN using feed-forward propagation. After each input, the output of the ANN is compared to the respective known output. Discrepancies between the output of the ANN and the known output that is associated with that particular input are used to generate an error value, which may be backpropagated through the ANN, after which the weight values of the ANN may be updated. This process continues until the pairs in the training set are exhausted.

After the training has been completed, the ANN may be evaluated against the testing set, to ensure that the training has not resulted in overfitting. If the ANN can generalize to new inputs, beyond those which it was already trained on, then it is ready for use. If the ANN does not accurately reproduce the known outputs of the testing set, then additional training data may be needed, or hyperparameters of the ANN may need to be adjusted.

ANNs may be implemented in software, hardware, or a combination of the two. For example, each weight 808 may be characterized as a weight value that is stored in a computer memory, and the activation function of each neuron may be implemented by a computer processor. The weight value may store any appropriate data value, such as a real number, a binary value, or a value selected from a fixed number of possibilities, that is multiplied against the relevant neuron outputs. Alternatively, the weights 808 (e.g., priority list weights, attribute weights for generating writing style/personalities, etc.) may be implemented as resistive processing units (RPUs), generating a predictable current output when an input voltage is applied in accordance with a settable resistance.

Figure 9:
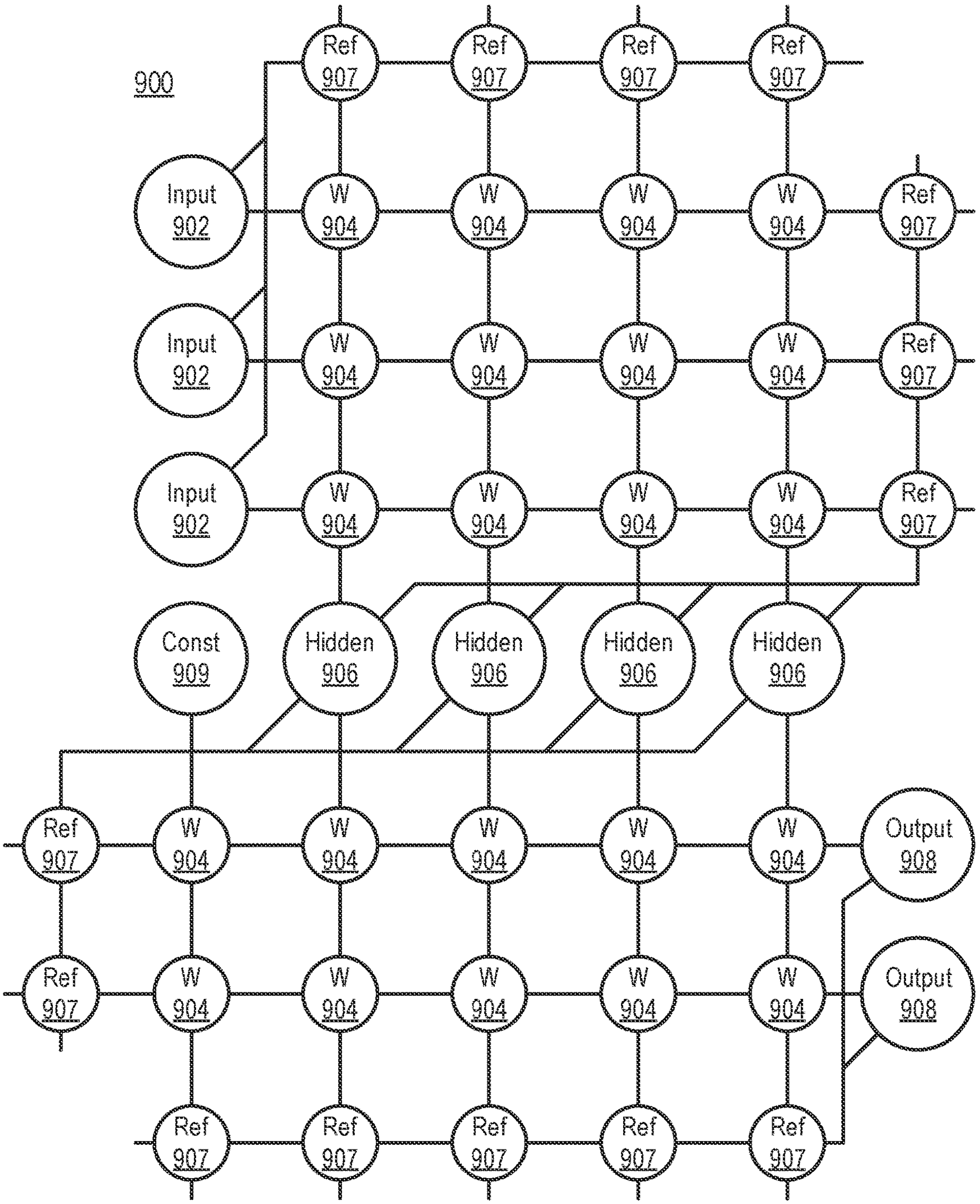
FIG. 9 is a hardware diagram showing an exemplary artificial neural network (ANN) system for neural network-based context aware code translation and optimization, in accordance with embodiments of the present invention.

Referring now to FIG. 9, a hardware diagram showing an exemplary artificial neural network (ANN) system 900 for neural network-based context aware code translation and optimization, is illustratively depicted in accordance with an embodiment of the present invention.

It should be understood that the present architecture is purely exemplary, and that other architectures or types of neural network can be used instead. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed, and the weights described herein can be replaced with more complicated forms of interconnection.

During feed-forward operation, input neurons 902 each provide an input voltage in parallel to a respective row of weights 904. In the hardware embodiment described herein, the weights 904 each have a settable resistance value, such that a current output flows from the weight 904 to a respective hidden neuron 906. The current output by the weight 904 therefore represents a weighted input to the hidden neuron 906.

Following the hardware embodiment, the current output by a given weight 904 is determined as $$I = \frac{V}{r},$$

where V is the input voltage from the input neuron 902 and r is the set resistance of the weight 904. The currents from each of the weights 904 (e.g., priority list weights, attribute weights for generating writing style/personalities, etc.) add column-wise and flow to a hidden neuron 906.

A set of reference weights 907 have a fixed resistance and combine their outputs into a reference current that is provided to each of the hidden neurons 906. Because conductance values can only be positive numbers, some reference conductance is needed to encode both positive and negative values in the matrix. The currents produced by the weights 904 are continuously valued and positive, and therefore the reference weights 907 are used to provide a reference current, above which currents are considered to have positive values and below which currents are considered to have negative values. The use of reference weights 907 is not needed in software embodiments, where the values of outputs and weights can be precisely and directly obtained. As an alternative to using the reference weights 907, another embodiment can use separate arrays of weights 904 to capture negative values.

The hidden neurons 906 use the currents from the array of weights 904 and the reference weights 907 to perform some calculation. This calculation may be, for example, any appropriate activation function, and may be implemented in hardware using appropriate circuitry, or in software.

The hidden neurons 906 then output a voltage of their own, based on the activation function, to another array of weights 904. This array performs its weighting calculations in the same way, with a column of weights 904 receiving a voltage from their respective hidden neuron 906 to produce a weighted current output that adds row-wise and is provided to the output neuron 908.

It should be understood that any number of these stages can be implemented, by interposing additional layers of arrays and hidden neurons 906. It should also be noted that some neurons can be constant neurons 909, which provide a constant output to the array. The constant neurons 909 can be present among the input neurons 902 and/or hidden neurons 906 and are only used during feed-forward operation.

During back propagation, the output neurons 908 provide a voltage back across the array of weights 904. The output layer compares the generated network response to training data and computes an error. The error is applied to the array as a voltage pulse, where the height and/or duration of the pulse is modulated proportional to the error value. In this example, a row of weights 904 receives a voltage from a respective output neuron 908 in parallel and converts that voltage into a current which adds column-wise to provide an input to hidden neurons 906. The hidden neurons 906 combine the weighted feedback signal with a derivative of its feed-forward calculation and stores an error value before outputting a feedback signal voltage to its respective column of weights 904. This back propagation travels through the entire network 900 until all hidden neurons 906 and the input neurons 902 have stored an error value.

The weight update process will depend on how the weights 904 are implemented. For settable resistances that include phase change materials, the input neurons 902 and hidden neurons 906 may apply a first weight update voltage forward and the output neurons 908 and hidden neurons 906 may apply a second weight update voltage backward through the network 900. The combinations of these voltages may create a state change within each weight 904, causing the weight 904 to take on a new resistance value, for example by raising a temperature of the weight 904 above a threshold and thus changing its resistance. In this manner the weights 904 can be trained to adapt the neural network 900 to errors in its processing.

As noted above, the weights 904 can be implemented in software or in hardware, for example using relatively complicated weighting circuitry or using resistive cross point devices. Such resistive devices may have switching characteristics that have a non-linearity that can be used for processing data. The weights 904 can belong to a class of device called a resistive processing unit (RPU). The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 10:
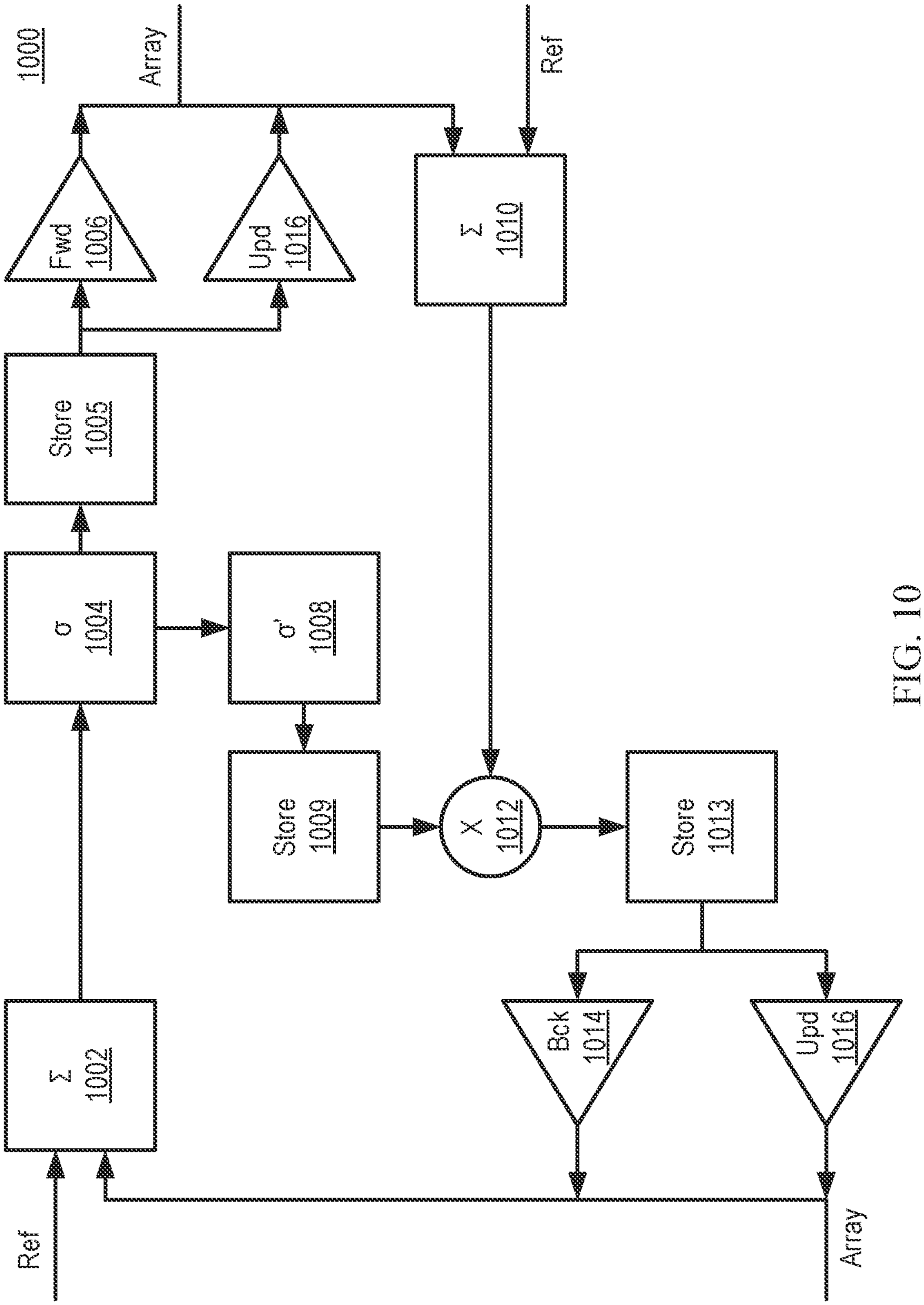
FIG. 10 is a block diagram showing an exemplary neuron in a neural network system for neural network-based context aware code translation and optimization, in accordance with embodiments of the present invention.

Referring now to FIG. 10, with continued reference to FIG. 9, a block diagram showing an exemplary neuron 1000 in a neural network system for neural network-based context aware code translation and optimization, is illustratively depicted in accordance with an embodiment of the present invention.

In various embodiments, this neuron can represent any of the input neurons 902, the hidden neurons 906, or the output neurons 908, as shown in FIG. 9. It should be noted that FIG. 10 shows components to address all three phases of operation: feed forward, back propagation, and weight update. However, because the different phases do not overlap, there will necessarily be some form of control mechanism within in the neuron 1000 to control which components are active. It should therefore be understood that there can be switches and other structures that are not shown in the neuron 1000 to handle switching between modes, in accordance with aspects of the present invention.

In feed forward mode, a difference block 1002 determines the value of the input from the array by comparing it to the reference input. This sets both a magnitude and a sign (e.g., + or −) of the input to the neuron 1000 from the array. Block 1004 performs a computation based on the input, the output of which is stored in storage 1005. It is specifically contemplated that block 1004 computes a non-linear function and can be implemented as analog or digital circuitry or can be performed in software. The value determined by the function block 1004 is converted to a voltage at feed forward generator 1006, which applies the voltage to the next array. The signal propagates this way by passing through multiple layers of arrays and neurons until it reaches the final output layer of neurons. The input is also applied to a derivative of the non-linear function in block 1008, the output of which is stored in memory 1009.

During back propagation mode, an error signal is generated. The error signal can be generated at an output neuron 908 or can be computed by a separate unit that accepts inputs from the output neurons 908 and compares the output to a correct output based on the training data. Otherwise, if the neuron 1000 is a hidden neuron 906, it receives back propagating information from the array of weights 904 and compares the received information with the reference signal at difference block 1010 to provide a continuously valued, signed error signal. This error signal is multiplied by the derivative of the non-linear function from the previous feed forward step stored in memory 1009 using a multiplier 1012, with the result being stored in the storage 1013. The value determined by the multiplier 1012 is converted to a backwards propagating voltage pulse proportional to the computed error at back propagation generator 1014, which applies the voltage to the previous array. The error signal propagates in this way by passing through multiple layers of arrays and neurons until it reaches the input layer of neurons 902.

During weight update mode, after both forward and backward passes are completed, each weight 904 is updated proportional to the product of the signal passed through the weight during the forward and backward passes. The update signal generators 1016 provide voltage pulses in both directions (though note that, for input and output neurons, only one direction will be available). The shapes and amplitudes of the pulses from update generators 1016 are configured to change a state of the weights 904 (e.g., priority list weights, attribute weights for generating writing style/personalities, etc.), such that the resistance of the weights 904 is updated, in accordance with aspects of the present invention.

Figure 11:
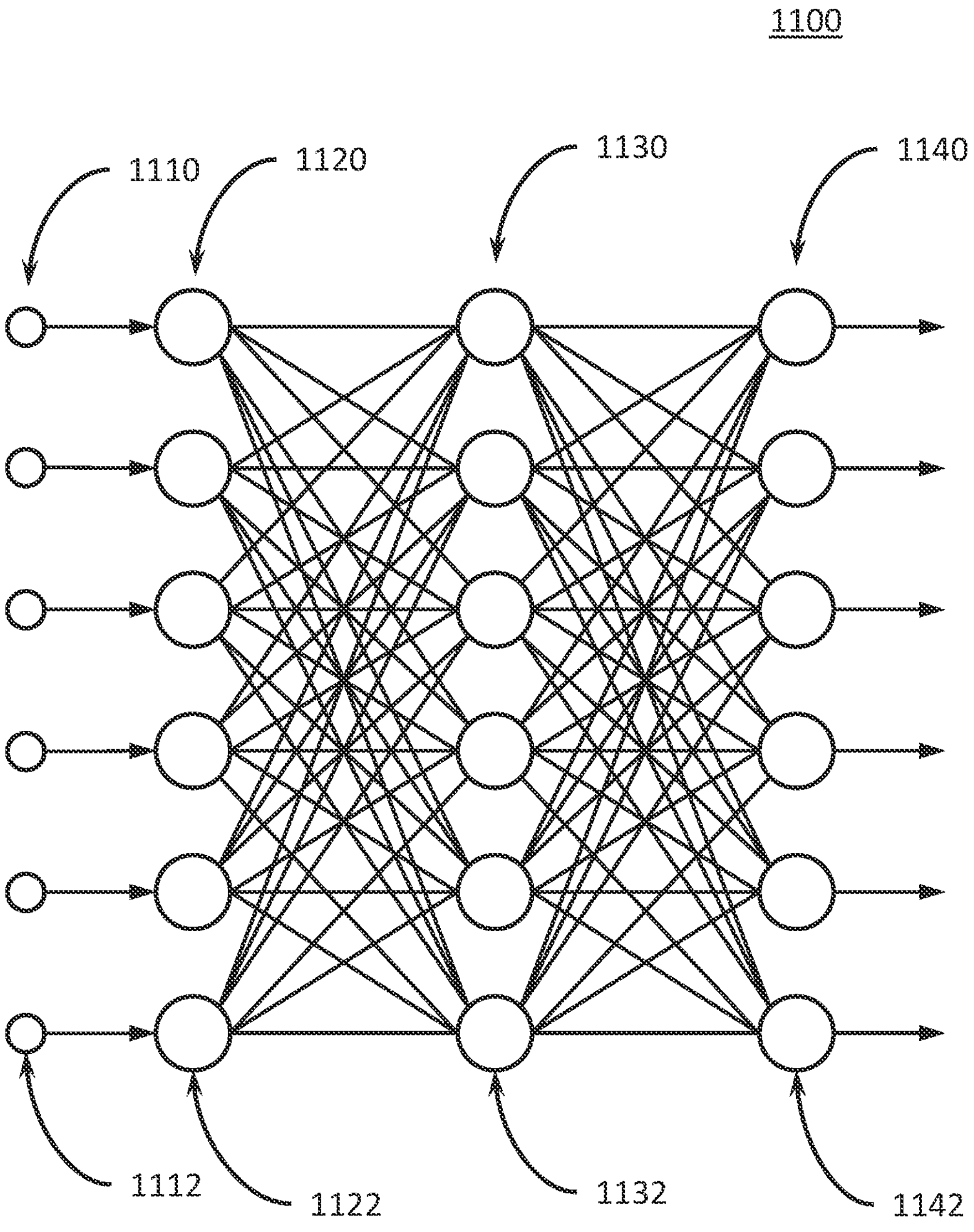
FIG. 11 is a diagram showing an exemplary layered neural network system for neural network-based context aware code translation and optimization, in accordance with embodiments of the present invention.

Referring now to FIG. 11, a diagram showing an exemplary layered neural network system 1100 in a neural network for neural network-based context aware code translation and optimization, is illustratively depicted in accordance with an embodiment of the present invention.

In layered neural networks, nodes are arranged in the form of layers. An exemplary simple neural network has an input layer 1120 of source nodes 1122, and a single computation layer 1130 having one or more computation nodes 1132 that also act as output nodes, where there is a single computation node 1132 for each possible category into which the input example could be classified. An input layer 1120 can have a number of source nodes 1122 equal to the number of data values 1112 in the input data 1110. The data values 1112 in the input data 1110 can be represented as a column vector. Each computation node 1132 in the computation layer 1130 generates a linear combination of weighted values from the input data 1110 fed into input nodes 1120, and applies a non-linear activation function that is differentiable to the sum. The exemplary simple neural network can perform classification on linearly separable examples (e.g., patterns).

A deep neural network, such as a multilayer perceptron, can have an input layer 1120 of source nodes 1122, one or more computation layer(s) 1130 having one or more computation nodes 1132, and an output layer 1140, where there is a single output node 1142 for each possible category into which the input example could be classified. An input layer 1120 can have a number of source nodes 1122 equal to the number of data values 1112 in the input data 1110. The computation nodes 1132 in the computation layer(s) 1130 can also be referred to as hidden layers, because they are between the source nodes 1122 and output node(s) 1142 and are not directly observed. Each node 1132, 1142 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, W_2, \ldots. W_{n-1}, W_n$. The output layer provides the overall response of the network to the inputted data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 1132 in the one or more computation (hidden) layer(s) 1130 perform a nonlinear transformation on the input data 1112 that generates a feature space. The classes or categories may be more easily separated in the feature space than in the original data space.

In various embodiments, the present invention can customize the neural network's architecture and training processes to optimize for context-aware translation of programming code. This involves leveraging layered networks to intricately map and interpret the syntax and semantics from one programming language to another, thus enhancing the accuracy and efficiency of code translation. The deep neural network's ability to discern nuanced patterns in data through multiple computation layers allows for refined adjustments during the training phase, ensuring the model's output aligns with sophisticated coding frameworks and contributes to advancements in neural network-based code translation technologies.

Figure 12:
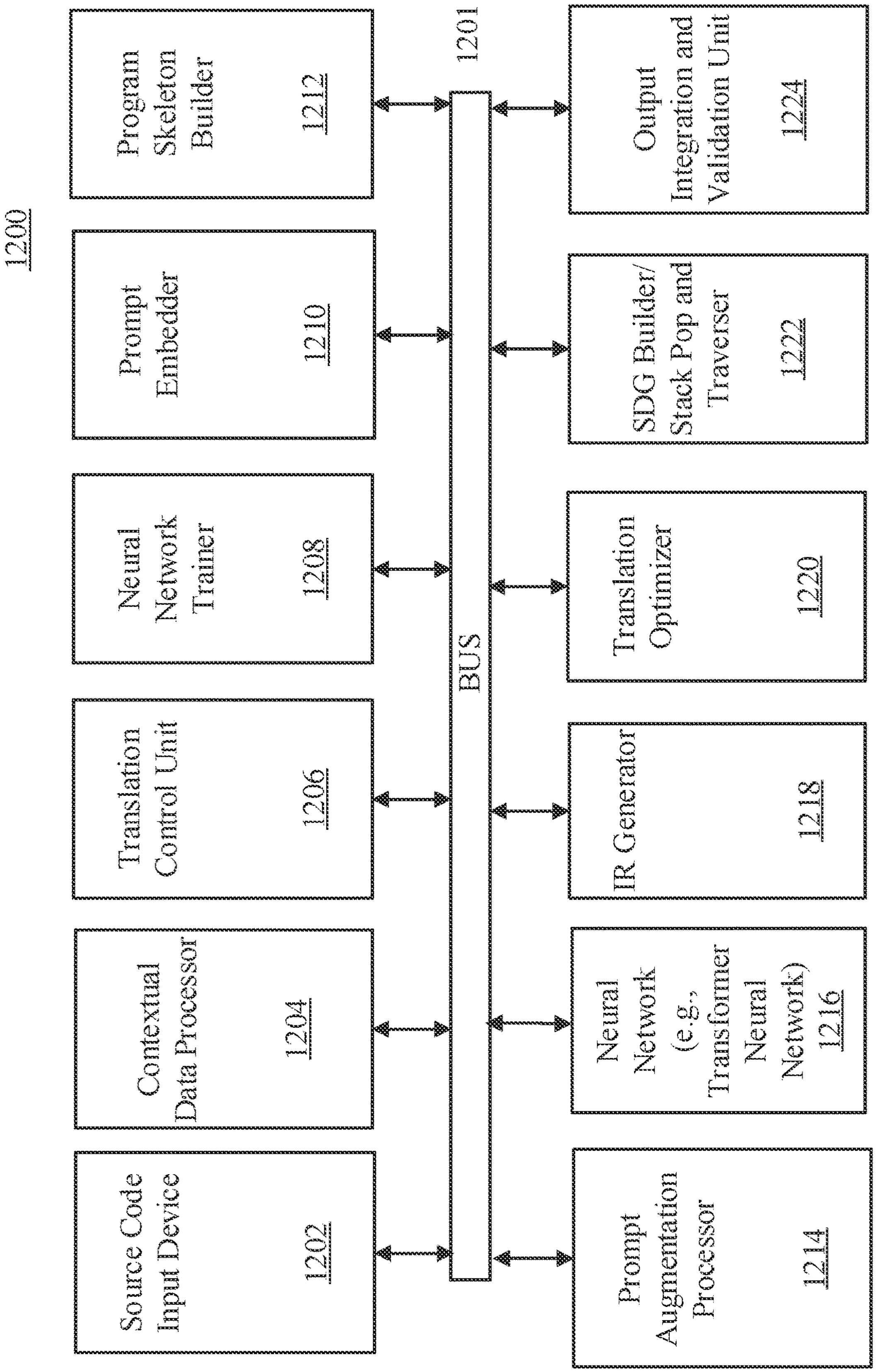
FIG. 12 is a diagram showing a system for neural network-based context aware code translation and optimization, in accordance with embodiments of the present invention.

Referring now to FIG. 12, a block diagram showing a system 1200 for neural network-based context aware code translation and optimization, is illustratively depicted in accordance with an embodiment of the present invention.

In various embodiments, in block 1202, a Source Code Input Device is depicted, serving as the initial interface for receiving the source code that is to be translated. It can process the raw code input, preparing it for subsequent analysis and translation phases.

In block 1204, a Contextual Data Processor, can function as an intermediary that enriches the source code with contextual information. This processor can enhance the code by embedding relevant data that may affect the translation process, such as comments, documentation, and metadata, ensuring a more accurate and context-aware translation output. The Translation Control Unit represented by block 1206 can control and orchestrate the overall translation workflow. It can direct the processed source code to appropriate components within the system, managing the interaction between the neural network trainer, the prompt embedder, and other critical elements to facilitate a seamless translation operation.

In block 1208, a Neural Network Trainer is a component responsible for the adaptive learning aspect of the system. It can fine-tune the neural network parameters using the contextual information provided, adapting the model to the specific nuances and requirements of the source code being translated. In block 1210, the Prompt Embedder can integrate strategic prompts into the translation process. These prompts can guide the neural network's focus during the translation, effectively steering the model's output towards the desired target language constructs. The Program Skeleton Builder in block 1212 can construct a foundational template of the target program structure. It can create a skeletal framework that outlines the major components and flow of the target program, setting up placeholders where the translated code can eventually be integrated.

In block 1214, the Prompt Augmentation Processor can enhance the input prompts with additional contextual tokens. These tokens can be utilized to improve the language model's understanding of the code's context, leading to translations with higher fidelity and relevance to the target programming language. In various embodiments, a NN (e.g., Transformer-based NN architecture) 1216 can be integrated with a LLM, such that the transformer's architecture can leverage the massive amount of parameters and the pre-training on extensive code corpora. The LLM, having learned patterns, structures, and the semantics of multiple programming languages, can guide the transformer network's training process for the specific task of code translation, in accordance with aspects of the present invention.

The LLM's pre-trained knowledge base can significantly enhance the transformer's ability to understand and translate complex code constructs by providing it with a broad understanding of programming language syntax and semantics. The combination of the transformer's structure with the LLM's extensive pre-training can provide more accurate and contextually relevant code translations than would be possible with either component alone, in accordance with aspects of the present invention.

In block 1218, the IR Generator can generate an Intermediate Representation (IR) of the source code. This IR can be a standardized format that abstracts the code, making it easier and more efficient for the system to analyze and translate across all different programming languages. The Translation Optimizer in block 1220 can apply various algorithms to refine the translated code. It ensures that the output not only maintains functional equivalence but also adheres to the idiomatic nuances and performance considerations of the target language.

In block 1222, the SDG Builder/Stack Pop and Traverser, can be utilized for constructing a System Dependency Graph (SDG) that maps out the dependencies and execution flow of the source code. It also can manage the traversal and translation of code segments, maintaining the logical and execution integrity of the original program.

In block 1224, the Output Integration and Validation Unit can be utilized for integrating code into the target program skeleton. It can validate the translated segments for syntactic and semantic accuracy, ensuring that the final program is not only correct but also optimized for the target execution environment.

As an illustrative example, in some embodiments, a high-level representation of one-shot learning is depicted as Algorithm 1, in accordance with aspects of the present invention. The model can be provided a simple task description and a representative example of what a successful task completion can look like is depicted herein below:

Algorithm 1: One-Shot Learning

```
"Convert Java to Python"   // Prompt
public class Foo inherits Bar => class Foo(Bar)   // Example 1
private static void spam(int x) => _________???_________   // Task
```

In some embodiments, the one-shot approach can be extended to few-shot learning by providing a simple task-description and several representative samples of what a successful task completion can look like are depicted below in Algorithm 2:

Algorithm 2: Few-Shot Learning

```
"Convert Java to Python"   // Prompt
public class Foo inherits Bar => class Foo(Bar)   //Example 1
public String baz(Foo foo) => def baz(foo: Foo) -> String   //Example 2
  ...
private static void spam(int x) => _________???_________   //Task
```

In some embodiments, Partial Label (PL) guided in-context learning can be executed according to Algorithm 3, depicted below:

Algorithm 3: Partial Label (PL) guided in-context learning

```
"Convert Java to Python"   // Prompt
public class Foo inherits Bar => class Foo(Bar)   //Example 1
public String baz(Foo foo) => def baz(foo: Foo) -> String   //Example 2
  ...
private static void spam(int x) => _________???_________   //Task
```

-continued

| Algorithm 3: Partial Label (PL) guided in-context learning |
|---|

```
public class Foo inherits Bar //Source 2
"create a {MODIFIER: public}{TEMPLATE: class} called {NAME: Foo} in
{TARGET: python} inheriting {INHERITS: Bar}"  //Prompt 1
class Foo(Bar)  //Target 1
  ...
private static void spam(int x)  //Source 2
"add a {MODIFIER: private} {TEMPLATE: static method} {NAME: spam} with
{ARGS: [{TYPE: int} x]} that {RETURNS: void}"  //Prompt 2
@staticmethod def _spam(x: int) -> None  //Target 2
```

In accordance with various embodiments, the "one-shot" and "few-shot" learning examples demonstrate the system's advanced learning algorithms which are integral to the invention's code translation process. The present invention enhances code translation through a system employing advanced learning techniques. Illustrated herein are "one-shot" and "few-shot" learning examples, demonstrating the system's proficiency in adapting to programming language constructs with minimal input.

In some embodiments, in block 1202, the system can be presented with a single prompt and task pair, exemplifying the model's capacity for "one-shot" learning. The system can leverage this single example to understand and translate the structure and semantics from Java to Python. The prompt, "Convert Java to Python," coupled with the class inheritance example, guides the model to formulate a correct translation, encapsulating the syntax and object-oriented principles of the source code. Here, the system can utilize a single example to learn and translate code syntax. It can infer the structural pattern from a Java class inheritance example and can apply this learning to generate an equivalent Python class, demonstrating the system's ability to capture and translate object-oriented concepts after observing just one instance.

Extending to block 1204, "few-shot" learning can be implemented, where the system assimilates several task descriptions and examples. This method can amplify the model's comprehension of the coding languages, refining its predictive accuracy for code translation. By processing a broader set of examples, the system can discern language patterns and nuances, thereby producing a more robust translation. This method expands the system's learning by analyzing multiple examples, allowing it to recognize a wider array of programming constructs. The system can extract patterns from multiple instances, leading to a more nuanced understanding and a refined translation output. This approach can enable the system to cater to the variances found in different programming tasks and adapt its translation mechanisms accordingly, in accordance with aspects of the present invention.

In various embodiments, the described one-shot and few-shot learning scenarios can be integral to the system's larger framework, connecting to block 1212, where the Program Skeleton Builder can leverage these learned patterns to construct a foundational structure for the translated code. Similarly, in block 1214, the Prompt Augmentation Processor can utilize the insights from these examples to enhance prompt structures, contributing to the system's overall translation efficacy. Both learning examples underpin the system's capability to process and translate code with high accuracy, reducing the need for extensive datasets. They can be utilized in the system's translation optimization, enabling it to quickly adapt to new languages and coding paradigms, and to ensure the translated code is syntactically and semantically accurate, in accordance with aspects of the present invention.

Figure 13:
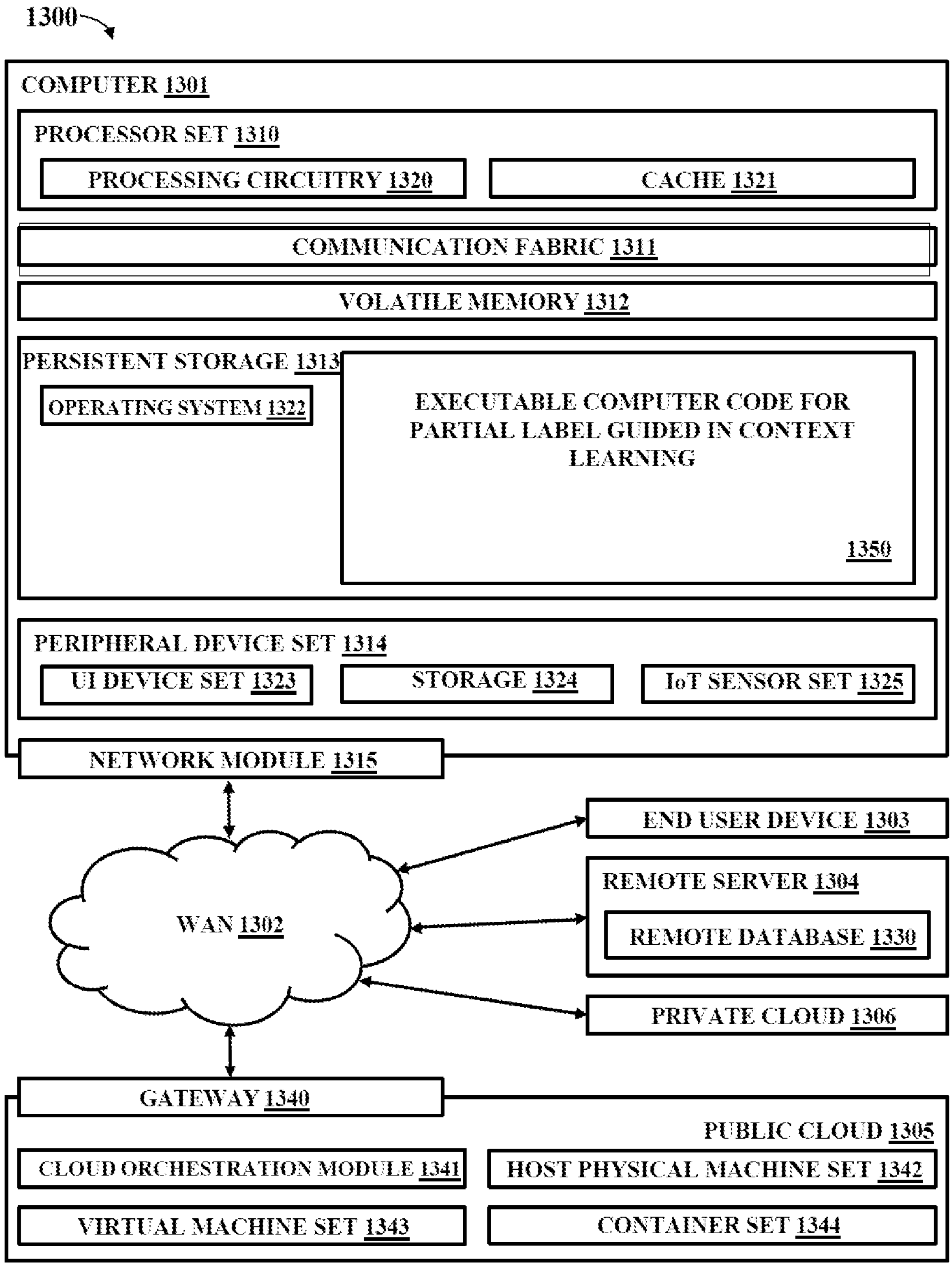
FIG. 13 is a diagram showing an exemplary computing environment for the execution of at least some of the computer code for adaptive neural network-based context aware code translation and optimization, in accordance with embodiments of the present invention.

Referring now to FIG. 13, an exemplary computing environment for the execution of at least some of the computer code for adaptive neural network-based context aware code translation and optimization is illustratively depicted in accordance with embodiments of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1300 contains an example of an environment for the execution of at least some of the computer code involved in performing the inventive methods, such as Partial Label Guided In-Context Learning 1350. This Partial Label Guided In-Context Learning 1350 can include utilizing partial labels and in-context learning for code translation. It can include providing detailed prompts with specific programming elements (e.g., class definition, method modifiers) and their corresponding translations. This code can be utilized to guide the translation process more precisely, taking into account the nuances of programming constructs and their context within the source and target languages. In various embodiments, this can be integral to the system's advanced learning capabilities, enabling accurate and context-aware translation of programming code across different languages, in accordance with aspects of the present invention.

In addition to block 1350, computing environment 1300 includes, for example, computer 1301, wide area network (WAN) 1302, end user device (EUD) 1303, remote server 1304, public cloud 1305, and private cloud 1306. In this embodiment, computer 1301 includes processor set 1310 (including processing circuitry 1320 and cache 1321), communication fabric 1311, volatile memory 1312, persistent storage 1313 (including operating system 1322 and block 200, as identified above), peripheral device set 1314 (including user interface (UI) device set 1323, storage 1324, and Internet of Things (IoT) sensor set 1325), and network module 1315. Remote server 1304 includes remote database 1330. Public cloud 1305 includes gateway 1340, cloud orchestration module 1341, host physical machine set 1342, virtual machine set 1343, and container set 1344.

COMPUTER 1301 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1330. As is well understood in the art of computer technology, and depending upon the technology, performance of a computer-implemented method may be distributed among multiple computers and/or between multiple locations. On the other hand, in this presentation of computing environment 1300, detailed discussion is focused on a single computer, specifically computer 1301, to keep the presentation as simple as possible. Computer 1301 may be located in a cloud, even though it is not shown in a cloud in FIG. 1. On the other hand, computer 1301 is not required to be in a cloud except to any extent as may be affirmatively indicated.

PROCESSOR SET 1310 includes one, or more, computer processors of any type now known or to be developed in the future. Processing circuitry 1320 may be distributed over multiple packages, for example, multiple, coordinated integrated circuit chips. Processing circuitry 1320 may implement multiple processor threads and/or multiple processor cores. Cache 1321 is memory that is located in the processor chip package(s) and is typically used for data or code that should be available for rapid access by the threads or cores running on processor set 1310. Cache memories are typically organized into multiple levels depending upon relative proximity to the processing circuitry. Alternatively, some, or all, of the cache for the processor set may be located "off chip." In some computing environments, processor set 1310 may be designed for working with qubits and performing quantum computing.

Computer readable program instructions are typically loaded onto computer 1301 to cause a series of operational steps to be performed by processor set 1310 of computer 1301 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1321 and the other storage media discussed below. The program instructions, and associated data, are accessed by processor set 1310 to control and direct performance of the inventive methods. In computing environment 1300, at least some of the instructions for performing the inventive methods may be stored in block 200 in persistent storage 1313.

COMMUNICATION FABRIC 1311 is the signal conduction path that allows the various components of computer 1301 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1312 is any type of volatile memory now known or to be developed in the future. Examples include dynamic type random access memory (RAM) or static type RAM. Typically, volatile memory 1312 is characterized by random access, but this is not required unless affirmatively indicated. In computer 1301, the volatile memory 1312 is located in a single package and is internal to computer 1301, but, alternatively or additionally, the volatile memory may be distributed over multiple packages and/or located externally with respect to computer 1301.

PERSISTENT STORAGE 1313 is any form of non-volatile storage for computers that is now known or to be developed in the future. The non-volatility of this storage means that the stored data is maintained regardless of whether power is being supplied to computer 1301 and/or directly to persistent storage 1313. Persistent storage 1313 may be a read only memory (ROM), but typically at least a portion of the persistent storage allows writing of data, deletion of data and re-writing of data. Some familiar forms of persistent storage include magnetic disks and solid state storage devices. Operating system 1322 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 1314 includes the set of peripheral devices of computer 1301. Data communication connections between the peripheral devices and the other components of computer 1301 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1323 may include components such as a display screen, speaker, microphone, wearable devices (such as goggles and smart watches), keyboard, mouse, printer, touchpad, game controllers, and haptic devices. Storage 1324 is external storage, such as an external hard drive, or insertable storage, such as an SD card. Storage 1324 may be persistent and/or volatile. In some embodiments, storage 1324 may take the form of a quantum computing storage device for storing data in the form of qubits. In embodiments where computer 1301 is required to have a large amount of storage (for example, where computer 1301 locally stores and manages a large database) then this storage may be provided by peripheral storage devices designed for storing very large amounts of data, such as a storage area network (SAN) that is shared by multiple, geographically distributed computers. IoT sensor set 1325 is made up of sensors that can be used in Internet of Things applications. For example, one sensor may be a thermometer and another sensor may be a motion detector.

NETWORK MODULE 1315 is the collection of computer software, hardware, and firmware that allows computer 1301 to communicate with other computers through WAN 1302. Network module 1315 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1315 are performed on the same physical hardware device. In other embodiments (for example, embodiments that utilize software-defined networking (SDN)), the control functions and the forwarding functions of network module 1315 are performed on physically separate devices, such that the control functions manage several different network hardware devices. Computer readable program instructions for performing the inventive methods can typically be downloaded to computer 1301 from an external computer or external storage device through a network adapter card or network interface included in network module 1315.

WAN 1302 is any wide area network (for example, the internet) capable of communicating computer data over non-local distances by any technology for communicating computer data, now known or to be developed in the future. In some embodiments, the WAN 1302 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1303 is any computer system that is used and controlled by an end user (for example, a customer of an enterprise that operates computer 1301), and may take any of the forms discussed above in connection with computer 1301. EUD 1303 typically receives helpful and useful data from the operations of computer 1301. For example, in a hypothetical case where computer 1301 is designed to provide a recommendation to an end user, this recommendation would typically be communicated from network module 1315 of computer 1301 through WAN 1302 to EUD 1303. In this way, EUD 1303 can display, or otherwise present, the recommendation to an end user. In some embodiments, EUD 1303 may be a client device, such as thin client, heavy client, mainframe computer, desktop computer and so on.

REMOTE SERVER 1304 is any computer system that serves at least some data and/or functionality to computer 1301. Remote server 1304 may be controlled and used by the same entity that operates computer 1301. Remote server 1304 represents the machine(s) that collect and store helpful and useful data for use by other computers, such as computer 1301. For example, in a hypothetical case where computer 1301 is designed and programmed to provide a recommendation based on historical data, then this historical data may be provided to computer 1301 from remote database 1330 of remote server 1304.

PUBLIC CLOUD 1305 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1305 is performed by the computer hardware and/or software of cloud orchestration module 1341. The computing resources provided by public cloud 1305 are typically implemented by virtual computing environments that run on various computers making up the computers of host physical machine set 1342, which is the universe of physical computers in and/or available to public cloud 1305. The virtual computing environments (VCEs) typically take the form of virtual machines from virtual machine set 1343 and/or containers from container set 1344. It is understood that these VCEs may be stored as images and may be transferred among and between the various physical machine hosts, either as images or after instantiation of the VCE. Cloud orchestration module 1341 manages the transfer and storage of images, deploys new instantiations of VCEs and manages active instantiations of VCE deployments. Gateway 1340 is the collection of computer software, hardware, and firmware that allows public cloud 1305 to communicate through WAN 1302.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1306 is similar to public cloud 1305, except that the computing resources are only available for use by a single enterprise. While private cloud 1306 is depicted as being in communication with WAN 1302, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1305 and private cloud 1306 are both part of a larger hybrid cloud.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method for efficient, neural network based translation and transformation of program code from a source language to a target language (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A method for efficiently translating program code from a source language to a target language, comprising:
- parsing, using a processor device, input source code into an Intermediate Representation (IR);
- establishing a structural and semantic model of the source code by applying static analysis to the IR;
- constructing a program skeleton of a target code from the IR, including generating context-aware placeholders filled with contextually relevant translations;
- transforming the IR into a Single Static Assignment (SSA) form and building a System Dependency Graph (SDG) from the SSA form;
- traversing the SDG to order basic blocks, and populating a dynamic SDG stack with the basic blocks;
- translating the basic blocks into the target language using a Large Language Model (LLM) with the context-aware placeholders to guide the LLM in generating functionally equivalent code;
- wherein the translating the basic blocks into the target language includes adapting the translated code segments to conform to runtime constraints of a target computing environment to enable execution of the translated program within the target environment and further adapting the translated code segments to meet specific additional performance metrics and resource constraints of a target computing environment, including one or more of memory usage, processing speed, and integration with existing software infrastructure; and
- generating a translated program by integrating translated code segments into a coherent program structure in the target language.

2. The method as recited in claim 1, further comprising receiving as the input a mixed-task batch of code segments for processing.

3. The method as recited in claim 1, wherein the applying the static analysis further includes generating nodes and corresponding metadata for each input code segment.

4. The method as recited in claim 1, wherein the contextually relevant translations are derived from the static analysis.

5. The method as recited in claim 1, further comprising enriching the IR with runtime dependency data.

6. The method as recited in claim 1, further comprising displaying the translated code segments on a user interface, receiving user inputs for code edits, compiling the edited code, and executing the compiled code to effectuate a transformation of state within a machine, the execution of the compiled code causing the machine to perform a series of operations resulting in a physical change indicative of functionality of the translated code in the target language.

7. A system for efficiently translating program code from a source language to a target language, comprising:
- a processor device operatively coupled to a computer-readable storage medium, the processor being configured for:
- parse input source code into an Intermediate Representation (IR);

establish a structural and semantic model of the source code by applying static analysis to the IR;

construct a program skeleton of a target code from the IR, including generating context-aware placeholders filled with contextually relevant translations;

transform the IR into a Single Static Assignment (SSA) form and building a System Dependency Graph (SDG) from the SSA form;

traverse the SDG to order basic blocks, and populate a dynamic SDG stack with the basic blocks;

translate the basic blocks into the target language using a Large Language Model (LLM) with the context-aware placeholders to guide the LLM in generating functionally equivalent code;

wherein the translate the basic blocks into the target language includes adapting the translated code segments to conform to runtime constraints of a target computing environment to enable execution of the translated program within the target environment and further adapting the translated code segments to meet specific additional performance metrics and resource constraints of a target computing environment, including one or more of memory usage, processing speed, and integration with existing software infrastructure; and generate a translated program by integrating translated code segments into a coherent program structure in the target language.

8. The system as recited in claim 7, wherein the processor is further configured for:

receive as the input a mixed-task batch of code segments for processing.

9. The system as recited in claim 7, wherein the applying the static analysis further includes generating nodes and corresponding metadata for each input code segment.

10. The system as recited in claim 7, wherein the contextually relevant translations are derived from the static analysis.

11. The system as recited in claim 7, wherein the processor is further configured for enriching the IR with runtime dependency data.

12. The system as recited in claim 7, wherein the processor is further configured for displaying the translated code segments on a user interface, receiving user inputs for code edits, compiling the edited code, and executing the compiled code to effectuate a transformation of state within a machine, the execution of the compiled code causing the machine to perform a series of operations resulting in a physical change indicative of functionality of the translated code in the target language.

13. A non-transitory computer readable storage medium comprising a computer readable program operatively coupled to a processor device for efficiently translating program code from a source language to a target language, wherein the computer readable program when executed on a computer causes the computer to perform steps of:

parse, using a processor device, input source code into an Intermediate Representation (IR);

establish a structural and semantic model of the source code by applying static analysis to the IR;

construct a program skeleton of a target code from the IR, including generating context-aware placeholders filled with contextually relevant translations;

transform the IR into a Single Static Assignment (SSA) form and building a System Dependency Graph (SDG) from the SSA form;

traverse the SDG to order basic blocks, and populate a dynamic SDG stack with the basic blocks;

translate the basic blocks into the target language using a Large Language Model (LLM) with the context-aware placeholders to guide the LLM in generating functionally equivalent code;

wherein the translate the basic blocks into the target language includes adapting the translated code segments to conform to runtime constraints of a target computing environment to enable execution of the translated program within the target environment and further adapting the translated code segments to meet specific additional performance metrics and resource constraints of a target computing environment, including one or more of memory usage, processing speed, and integration with existing software infrastructure; and generate a translated program by integrating translated code segments into a coherent program structure in the target language.

14. The non-transitory computer readable storage medium of claim 13, wherein the applying the static analysis further includes generating nodes and corresponding metadata for each input code segment.

15. The non-transitory computer readable storage medium of claim 13, wherein the contextually relevant translations are derived from the static analysis.

* * * * *